United States Patent
Carlson et al.

(10) Patent No.: US 8,752,621 B2
(45) Date of Patent: Jun. 17, 2014

(54) SYSTEM AND METHOD FOR WELL CONTROL

(75) Inventors: Koby B. Carlson, Midland, TX (US); Coy R. Lawrence, White Oak, TX (US); David D. Walls, Katy, TX (US); Kenneth P. Kountz, Grand Junction, CO (US); Cynthia G. Thane, Austin, TX (US); Nick J. Moschetti, Loma, CO (US)

(73) Assignee: Chevron U.S.A. Inc., San Ramon, CA (US)

( * ) Notice: Subject to any disclaimer, the term of this patent is extended or adjusted under 35 U.S.C. 154(b) by 595 days.

(21) Appl. No.: 12/943,148

(22) Filed: Nov. 10, 2010

(65) Prior Publication Data

US 2011/0118882 A1 May 19, 2011

Related U.S. Application Data

(60) Provisional application No. 61/261,093, filed on Nov. 13, 2009.

(51) Int. Cl.
*E21B 43/12* (2006.01)
*G05D 7/00* (2006.01)

(52) U.S. Cl.
USPC ..................... 166/250.15; 700/282

(58) Field of Classification Search
USPC .................. 166/250.15, 105, 53; 700/282
See application file for complete search history.

(56) References Cited

U.S. PATENT DOCUMENTS

| | | | | |
|---|---|---|---|---|
| 4,410,038 A | * | 10/1983 | Drapp | 166/53 |
| 4,633,954 A | | 1/1987 | Dixon et al. | |
| 5,912,883 A | * | 6/1999 | Hershberg | 370/319 |
| 6,368,068 B1 | * | 4/2002 | Corlew et al. | 417/120 |
| 6,516,879 B1 | | 2/2003 | Hershberger | |
| 6,719,060 B1 | | 4/2004 | Wells | |
| 7,591,308 B2 | * | 9/2009 | Bender | 166/250.15 |
| 8,195,401 B2 | * | 6/2012 | Ella et al. | 702/13 |
| 8,214,186 B2 | * | 7/2012 | Cuevas et al. | 703/10 |
| 2007/0175640 A1 | | 8/2007 | Atencio et al. | |
| 2011/0118882 A1 | * | 5/2011 | Carlson et al. | 700/282 |

* cited by examiner

*Primary Examiner* — Daniel P Stephenson
(74) *Attorney, Agent, or Firm* — Ana C. Jaquez

(57) ABSTRACT

Systems and methods are provided for supervising the control of wells in a grouping of wells, or "well pads," in a subterranean hydrocarbon reservoir so as to coordinate operation of the well pad. By coordinating operation of the well pad, hydrocarbon production for the well pad can be optimized. An exemplary method includes the steps of generating a plurality of requests to control individual wells of the well grouping, queuing the requests, and authorizing the requests based on one or more criteria associated with the well grouping so as to coordinate operation of the well grouping.

20 Claims, 19 Drawing Sheets

42

One wellpad with multiple wells (each well, for example, having Plunger Lift Mechanisms $20_1$ - $20_{22}$)

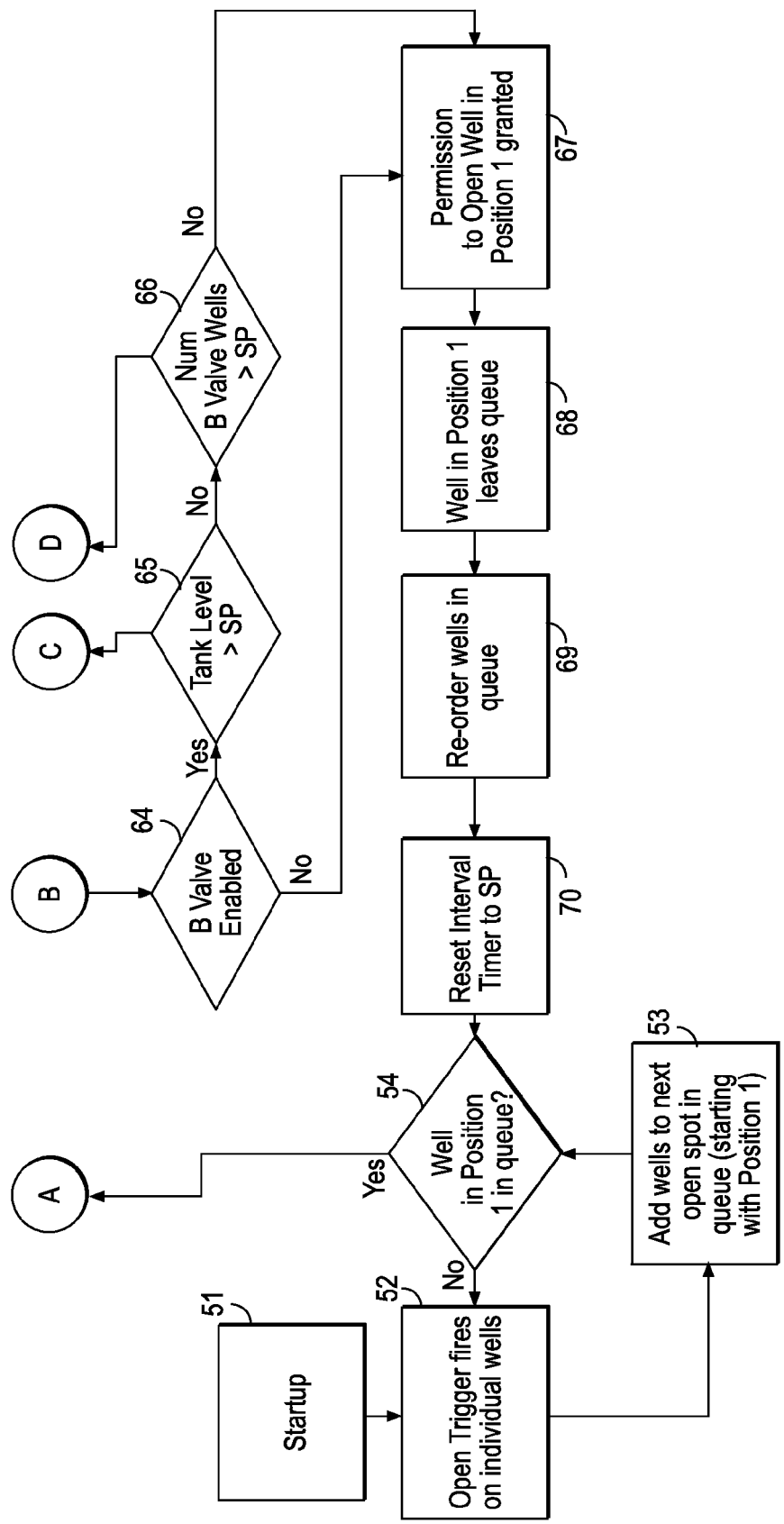

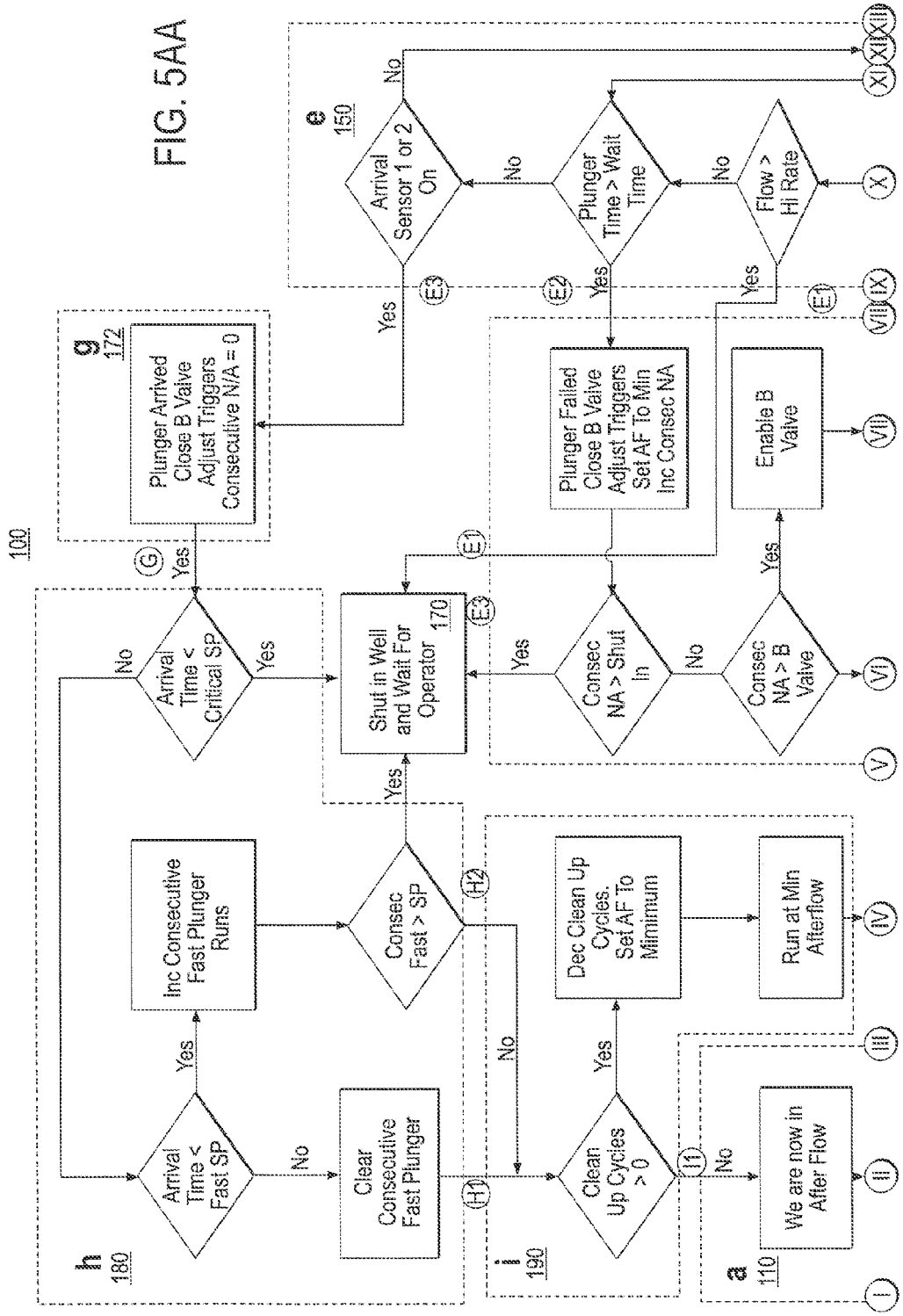

Plunger Lift Well Setpoints

Poll Configuration Data Timer [ 56 ]

[ Object Security ] [ Test Defaults ] [ Defaults ] [ History ] [ Close ] [ Save Settings ]

400 — overall; 410 Open Triggers; 420 Close Triggers; 430; 440 Plunger Arriving Setpoints; 450 Intermitter Setpoints; 460 Plunger No Arrival Setpoints; 470 Miscellaneous Setpoints

| Open Triggers | |
|---|---|
| Buildup Time > | 00:01:30 |
| Energy > | 5 |
| Casing PSI < | 1.1 |
| Casing Minus Tubing < | 1.2 |
| Casing Minus Line > | 2.2 |
| Load Factor < | 3.3 |
| Tubing PSI > | 4.4 |
| Tubing Minus Line > | 5.5 |
| Tubing Rate Of Change < | 6.6 |

| Close Triggers | |
|---|---|
| Trigger True Timer Preset | 00:01:40 |
| Flow Rate < | 10.1 |
| Percent Critical Flow < | 11.2 |
| Casing PSI < | 12.3 |
| Casing Minus Tubing > | 13.4 |
| Casing Minus Line < | 14.5 |
| Tubing PSI < | 15.6 |

| Intermitter Setpoints | |
|---|---|
| Open Time | 00:00:30 |
| Close Time | 00:01:00 |

| Plunger Arriving Setpoints | |
|---|---|
| Plunger Wait Time | 00:01:01 |
| Plunger Critical Fast Time | 00:00:20 |
| Plunger Fast Time | 00:00:30 |
| Plunger Consec Fast Shut In | 3 |
| Flow Line Hi PSI | 475.0 |
| Flow Line Test Timer | 00:00:10 |
| Flow Line Hi Restart Timer | 00:01:00 |
| B Valve Head Gas Timer | 00:00:30 |
| B Valve Max PSI | 250.0 |
| Gas High Flow Rate | 475.0 |
| Gas High Flow Rate Time | 10.0 |
| Gas High Flow Rate Bypass | 00:00:20 |

| Plunger No Arrival Setpoints | |
|---|---|
| Auto Cleanup Cycles | 1 |
| Consec No Arrival Recover | 1 |
| Consec No Arrival B Valve | 2 |
| Consec No Arrival Shut In | 0 |
| Recover Time 1 | 00:01:10 |
| Recover Time 2 | 00:01:11 |
| Recover Time 3 | 00:01:12 |
| Recover Time 4 | 00:01:13 |
| Recover Time 5 | 00:01:14 |
| Recover Tubing PSI | 475.0 |

| Automatic Afterflow Setpoints | |
|---|---|
| Plunger Target Time | 00:00:45 |
| Afterflow Min | 00:01:00 |
| Afterflow Max | 00:02:00 |
| Afterflow Max Step Up | 00:00:10 |
| Afterflow Max Step Down | 00:00:15 |
| Afterflow Manual Time | 00:01:30 |
| Plunger Fast Gain | 1.000 |
| Plunger Slow Gain | 2.000 |

| Miscellaneous Setpoints | |
|---|---|
| Critical Flow Factor | 1.200 |
| Plunger Fall Time | 00:00:30 |
| Plunger Target FPM | 0 |
| Well Depth | 0 |
| Tubing Size ID | 1.999 |
| Plunger Manufacturea | 0 |
| Plunger Type | 0 |
| Plunger Size | 0.000 |
| Plunger Weight | 0.000 |
| Plunger Ball Type | 0 |
| Plunger Ball Size | 0.000 |
| Plunger Ball Weight | 0.000 |

FIG. 9

| DATE | | Status | | MAIN | | | | TIME | |
|---|---|---|---|---|---|---|---|---|---|
| RTU | Minutes Since Polled | Controller State | State Time | Target Time | Arrival Time | Today Arrived | Today Failed | Consec Arrive | Consec Failed |
| Pad 1 Well 1 | 1 | Build Up | 00:20:48 | 00:08:00 | 00:18:00 | 16 | 4 | 6 | 0 |
| Pad 1 Well 2 | 1 | Build Up | 00:02:57 | 00:12:00 | 00:00:00 | 0 | 18 | 0 | 34 |
| Pad 1 Well 3 | 1 | Wait Plunger | 00:10:42 | 00:08:00 | 00:15:02 | 1 | 11 | 1 | 0 |
| Pad 1 Well 4 | 1 | Recover | 00:39:02 | 00:09:00 | 00:00:00 | 0 | 9 | 0 | 42 |
| Pad 1 Well 5 | 1 | Build Up | 00:05:33 | 00:11:00 | 00:06:44 | 11 | 8 | 23 | 0 |
| Pad 1 Well 6 | 1 | Wait Plunger | 00:08:50 | 00:09:00 | 00:13:07 | 18 | 2 | 18 | 0 |
| Pad 2 Well 1 | 1 | After Flow | 00:03:00 | 00:06:30 | 00:08:11 | 29 | 11 | 2 | 0 |
| Pad 2 Well 2 | 1 | Recover | 00:16:15 | 00:10:00 | 00:00:00 | 24 | 6 | 0 | 1 |
| Pad 2 Well 3 | 1 | Wait Plunger | 00:14:35 | 00:25:00 | 00:00:00 | 5 | 5 | 0 | 1 |
| Pad 2 Well 4 | 1 | Recover | 00:25:36 | 00:12:00 | 00:00:00 | 8 | 5 | 0 | 5 |
| Pad 2 Well 5 | 1 | Recover | 00:36:49 | 00:15:00 | 00:00:00 | 6 | 7 | 0 | 1 |
| Pad 2 Well 6 | 0 | Build Up | 00:07:07 | 00:10:00 | 00:00:00 | 0 | 0 | 0 | 0 |

Poll Configuration Data Timer [ 57 ]

| Supervisor Setpoints | |
|---|---|
| Well Interval Time | 00:00:20 |
| Max Tank Level | 11.0 |
| Max Liquid Level | 0.0 |
| Max Pad Pressure | 0.0 |
| Min Pad Pressure | 0.0 |
| Max Gas Rate | 0 |
| Max Wells Arrive | 2 |
| Max Wells Afterflow | 3 |
| Max Wells A Valve | 3 |
| Max Wells B Valve | 1 |

710

Save

Close

| Quick Watch Well 1 | | | | | | | | | Close | | | Print | | | | | | Legend | | | |
|---|---|---|---|---|---|---|---|---|---|---|---|---|---|---|---|---|---|---|---|---|---|---|
| Time in Controller State: | 12013:36:59 | | | | | | | | | | | | | | | | | Close State | | ○ | |
| State Time Left: | 0 00:00:00 | | | | | | | | | | | | | | | | | Open State | | ✛ | |
| B Valve Time: | 0 00:00:00 | | | | | | | | | | | | | | | | | B Valve Enabled | | △ | |
| Flow Rate: | 51.6 | | | | | | | | | | | | | | | | | Plunger In Hole | | □ | |

Automatic & Valve States

| | M 01 | A 02 | M 03 | A 04 | A 05 | A 06 | A 07 | A 08 | A 09 | M 10 | I 11 | I 12 | A 13 | A 14 | M 15 | A 16 | A 17 | A 18 | A 19 | M 20 | M 21 | M 22 |
|---|---|---|---|---|---|---|---|---|---|---|---|---|---|---|---|---|---|---|---|---|---|---|
| Controller Mode | ○ | ○ | ○ | | | | | | | ○ | | | | | ○ | | | | | ○ | ○ | ○ |
| Well Position | | | | | | | | | | | | | | | | | | | | | | |
| Automatic Disabled | | | | | | | | | | | | | | | | | | | | | | |
| Close Flow Line | | | | | | | | | | | | | | | | | | | | | | |
| Check Plunger Fell | | ○ | | | ○ | | | | | | | | | | | | | | | | | |
| Plunger Falling | | | | | | | | | ○ | | | | | | | | | | | | | |
| Build Up | | | | ○ | | | | ○ | | | | | | | | | | | | | | |
| Queue Well | | | | | | | | | | | | | | | | | | | | | | |
| Wait For Supervisor | | | | | | | | | | | | | | | | | | | | | | |
| Wait For SSV & Choke | | | | | | | | | | | | | | | | | | | | | | |
| Open Flow Line | | | | | | | | | | | | | | | | | | | | | | |
| Flowline Stabilize | | | | | | | | | | | | | | | | | | | | | | |
| Check Tubing PSI | | | | | | | | | | | | | | | | | | | | | | |
| High Flow Line | | | | | | | | | | | | | | | | | | | | | | |
| Waiting For Plunger | | | | | | | □ | | | | | | | | | | | | | | | |
| Check Second Sensor | | | | | | | | | | | | | | | | □ | | | | | | |
| Plunger Arrived | | | | | | | | | | | | | | | | | | | △ | | | |
| Plunger Failed | | | | | | | | | | | | | | | | | | | | | | |
| Clear Fluid | | | | | | | | | | | | | | □ | | | | | | | | |
| Min Afterflow | | | | | | □ | | | | | | | | | | | | | | | | |
| Afterflow | | | | | | | | | | | | | ○ | | | | ○ | ○ | | | | |
| Recover | | | | | | | | | | | | | | | | | | | | | | |
| Wait For Operator | | | | | | | | | | | | | | | | | | | | | | |
| Surface Safety Valve | □ | □ | □ | □ | □ | □ | □ | □ | □ | □ | □ | □ | □ | □ | □ | □ | □ | □ | □ | □ | □ | □ |
| A Valve Should | | ○ | | ○ | ○ | ○ | ○ | ○ | ○ | | ○ | ○ | ○ | ○ | | ○ | ○ | ○ | ○ | ○ | ○ | ○ |
| B Valve Should | | | | | | | | | | | | | | | | | | | ○ | | | |

SYSTEM AND METHOD FOR WELL CONTROL

FIELD OF THE INVENTION

The present invention relates to system and method for controlling well operation, and in particular, a system and method for supervising and optimizing the operation of a grouping of wells in a gas or oil field.

BACKGROUND OF THE INVENTION

Conventional well control systems, such as plunger lift control systems, typically only include algorithms for controlling the operation of individual wells without regard for the coordinated operation of surrounding wells or a grouping of wells. For example, while conventional algorithms for opening and closing one or more well valves may maximize production from an individual well, no account is taken for the overall optimized performance of a grouping of multiple wells or the hydrocarbon reservoir in general.

As such, a need exists to coordinate the operation of individual wells in one of more groupings of multiple wells ("well pads") in a hydrocarbon reservoir so as to optimize production and other performance parameters of the well pads in the hydrocarbon reservoir.

A further need exists to identify multiple alarm/alert situations associated with a well pad and related well plunger lift control systems that may require operator intervention, e.g., multiple dry trips, no plunger trips, etc., to manage such situations "by exception."

SUMMARY OF THE INVENTION

A system and computer-implemented method is provided for controlling a plurality of individual wells in a hydrocarbon reservoir. In accordance with one embodiment of the present invention, a well control system for a subterranean hydrocarbon reservoir includes: a plurality of well control systems, each of the well control systems being associated with an individual well of a grouping of wells in the subterranean reservoir; a plurality of well controllers associated with each of the individual well control systems; and a supervisor controller in communication with each of the well controllers for coordinating operation of each of the well control systems so as to coordinate operation of the grouping of wells. The supervisor controller can be used to operate the wells of the well grouping, and used to optimize hydrocarbon production and/or other operating parameters or criteria related to the well grouping and/or the hydrocarbon reservoir in general.

In one embodiment of the disclosed system, each of the well control systems include a well plunger lift mechanism, each of the well controllers include a well plunger lift controller for controlling operation the corresponding well plunger lift mechanism, and the supervisor controller includes a supervisor plunger lift controller in communication with each of the well plunger lift controllers.

In accordance with another aspect of the present invention, a computer-implemented method of operating a subterranean hydrocarbon reservoir includes: generating a plurality of requests to control individual wells of a well grouping; queuing the requests; and authorizing the requests based on one or more criteria associated with the well grouping so as to coordinate operation of the well grouping. Criteria associated with the well grouping may include plunger lift parameters, including but not limited to wellpad pressure, well pad flow rate, plunger arrival states, number of open or closed well valves, well pad flow rate, etc. Other criteria may relate to well pad equipment power consumption, equipment usage maintenance requirements and safety requirements.

In accordance with a third aspect of the invention, a computer program product includes a computer usable media having a computer readable program code embodied therein. The computer readable program code is adapted to implement a method of conducting activities related to a hydrocarbon reservoir, the method comprising: generating a plurality of requests to control individual wells of a well grouping; queuing the requests; and authorizing the requests based on one or more criteria associated with the well grouping so as to coordinate operation of the well grouping.

BRIEF DESCRIPTION OF THE DRAWINGS

A detailed description of the present invention is made with reference to specific embodiments thereof as illustrated in the appended drawings. The drawings depict only typical embodiments of the invention and therefore are not to be considered to be limiting of its scope.

FIGS. 4A-B are collectively a flow chart showing an exemplary method for a well plunger lift control supervisor in accordance with the present invention.

FIGS. 5a-i are flow charts showing an exemplary method for a well plunger lift single well controller in accordance with the present invention.

FIG. 9 is an exemplary graphical user interface for displaying and setting plunger lift well set points in accordance with the present invention.

FIG. 10 is an exemplary graphical user interface for displaying plunger supervisor status information in accordance with the present invention.

FIG. 12 is an exemplary graphical user interface for displaying and setting plunger lift supervisor set points in accordance with the present invention.

FIG. 13 is an exemplary graphical user interface for displaying well state information in accordance with the present invention.

DETAILED DESCRIPTION

Figure 1:
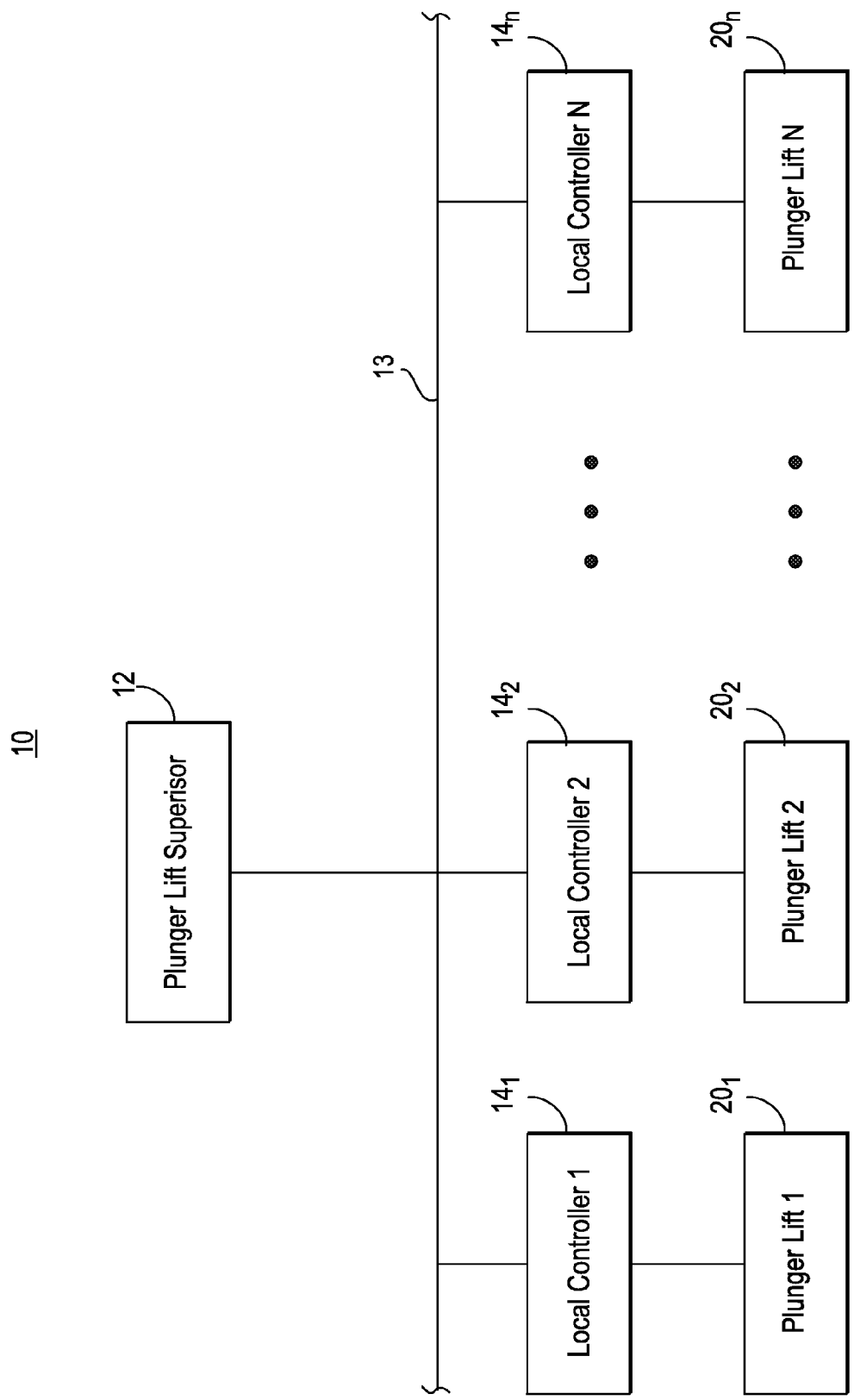
FIG. 1 is a block diagram of an exemplary well plunger lift control architecture in accordance with the present invention.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multi-processor computer processors system, hand-held devices, programmable consumer electronics, mini-computers, mainframe computers, and the like. The invention may also be practiced in distributed computing environments where tasks are performed by servers or other processing devices that are linked through a one or more data communications network. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

The present invention relates to a system and method for operating a plurality of well control systems in a well pad or other grouping of wells at a hydrocarbon reservoir. As shown in FIG. 1, the system includes one or more computer processors 12 for executing computer readable program code for supervising the control of individual well control systems, shown by way of examples as multiple plunger lift systems $20_1$-$20_n$. As shown in FIG. 1, the supervisor or "global" controller 12 is in communication via data communications media 13 with one or more "local" controllers $14_1$-$14_n$, which are programmed to control corresponding plunger lift control systems/mechanisms/arrangements $20_1$-$20_n$ at individual well locations within the well pad or grouping of wells. Alternatively, the global and local controller components of the well control architecture of FIG. 1 can reside and/or be executed on a single processor, or distributed among multiple processors in communication via any suitable data communications network.

Each of the global and local controllers can have one or more graphical user interfaces for displaying and configuring plunger pad and individual well plunger information and parameters. The user interfaces can be displayed, for example, via dedicated display terminals at well or well pad control stations, including, but not limited to, desktop computers, laptop computers, personal digital assistants (PDAs), wireless telephones, smart phones and/or the like.

Figure 2:
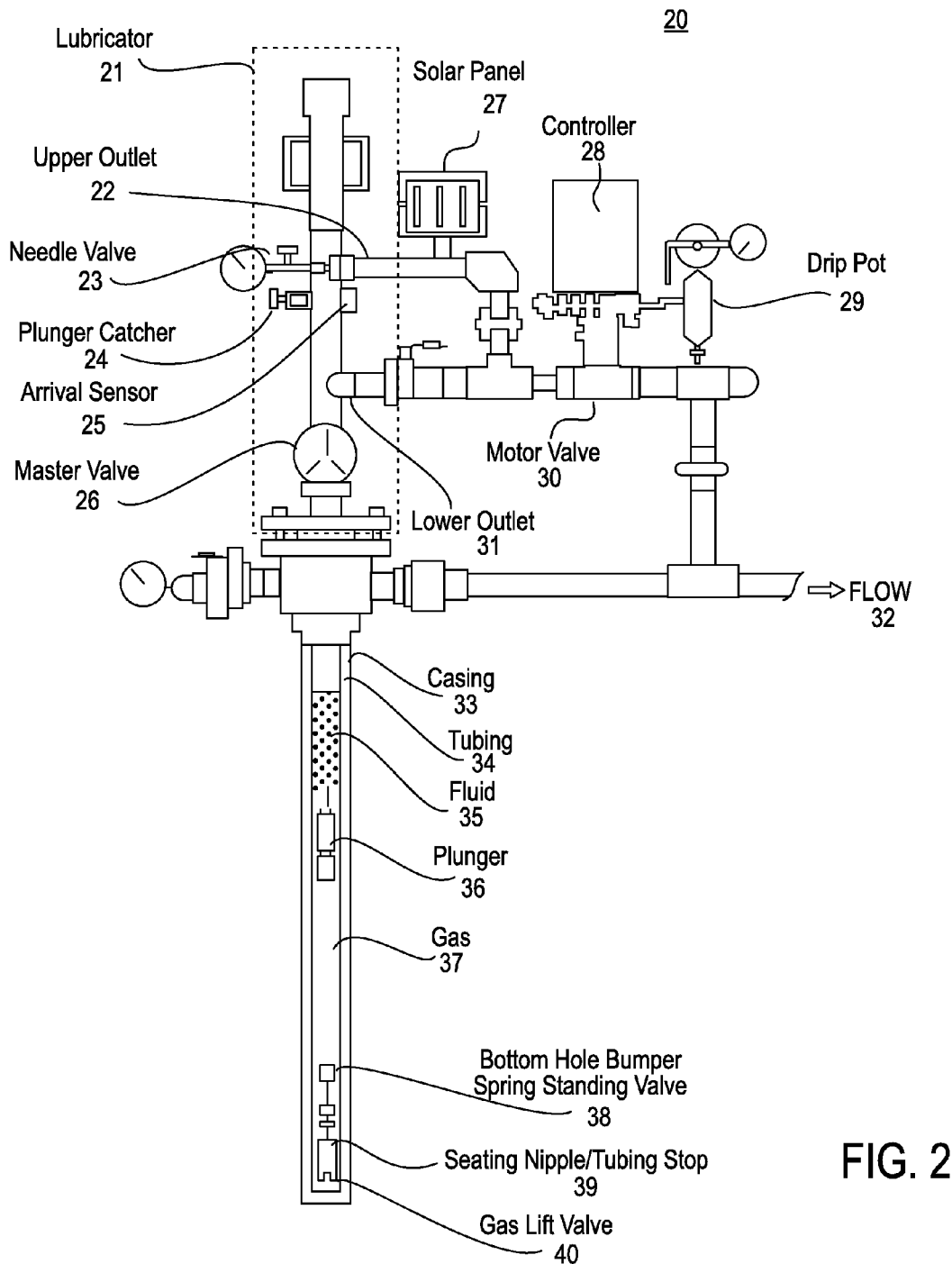
FIG. 2 is diagram showing an exemplary well plunger arrangement in accordance with the present invention.

A non-limiting embodiment of the present invention is now described with reference to FIG. 2, which shows an exemplary well plunger lift system 20 in accordance with the present invention. System 20 performs a plunger lift function, which is a form of so-called "artificial lift" designed to increase and/or stabilize production in hydrocarbon wells, such as oil or gas wells, in a subterranean reservoir. A typical plunger device 36 in such as system creates a boundary between the liquid and gas and functions to push the liquid to the surface by building up gas pressure on the underside of the plunger 36. The boundary between liquid and gas eliminates liquid fallback thereby decreasing the volume of liquid that is loading up in the well. Generally, when a gas well is in a "closed" state, production gas stops flowing to the surface and the pressure holding the plunger at the top of the well is eliminated. At that time, the plunger is overtaken by gravity and it falls downhole. This starts the buildup of pressure bottomhole as gas and or fluid flows from the subterranean reservoir. This phase of the plunger lift process is called "Build Up." After a sufficient amount of pressure is built up, and the well is opened. Tubing pressure decreases. If the force of the gas below the plunger is greater than the liquid above, the gas pushes the plunger and the liquid to the surface. This period of waiting on the plunger is referred to as "Arrival." After the plunger arrives at the surface, the well continues to flow for a period of time. This period of the plunger lift process is referred to as "Afterflow." The well is then closed again to repeat the process.

Referring again to FIG. 2, an exemplary plunger lift control system 20 located a well head includes a lubricator 21, upper outlet 22, needle valve 23, plunger catcher 24, arrival sensor 25, master valve ("Valve A") 26, solar panel 27, controller 28, drip pot 29, motor valve 30, lower outlet 31, well casing 33, tubing 34, plunger 36, bottom hole bumper 38, spring standing valve, seating nipple/tubing stop 39, and gas lift valve 40. Note, the motor valve 30, solar panel 27, controller 28 and other components of the plunger lift control systems 20 can be located remotely from the well head. When Valve A is commanded to be closed, the plunger 36 falls to the bottom of the well casing 33 and the flow of hydrocarbon product 37 from the subterranean reservoir is shut-off. When certain operational parameters are satisfied, Valve A is opened and the plunger 36 thereby allowed to travel upwards through the well casing 33 to a resting position at the plunger catcher 24, thus allowing the follow of hydrocarbon product 37 from the subterranean reservoir. The controller 28 can house and/or execute one or more of the computer program codes for the global and local control elements of the present invention. A secondary valve, Valve B (not shown) can be provided for maintenance purposes and located upstream or downstream of the motor valve 30. A choke (also not shown) may be located upstream of the motor valve 30.

Figure 3:
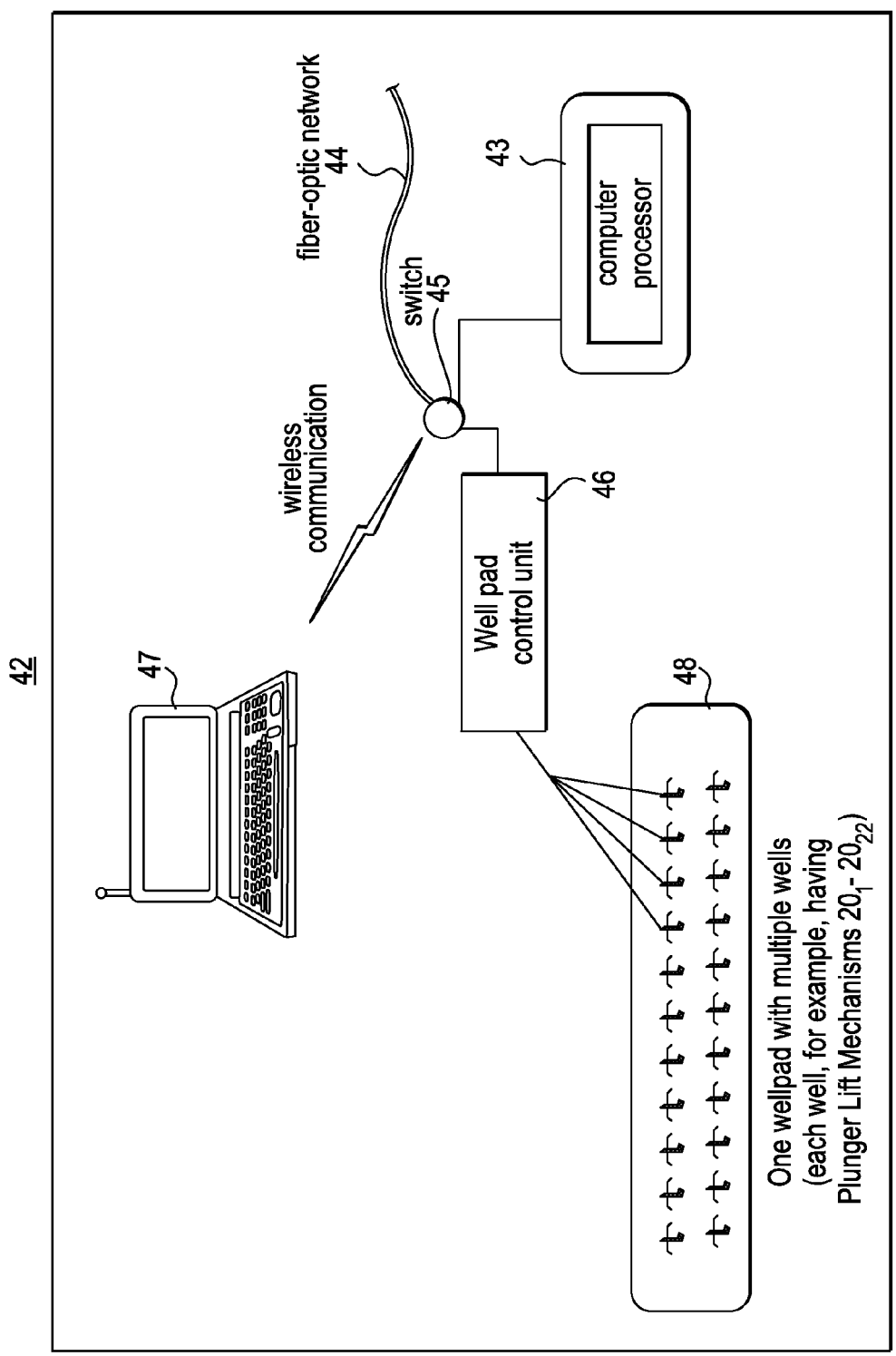
FIG. 3 is a block diagram of another exemplary well plunger lift control system in accordance with the present invention.

FIG. 3 shows another embodiment of the well plunger lift control system in accordance with the present invention. In this embodiment, the system 42 is implemented in the form of a closed-loop control system that enables real-time, remote optimization of the plunger lift system on individual wells and across a multi-well "well pad." The control system 42 includes a computer processor 43, for example a GE® Quick Panel processor located at a pad control location, which is programmed with the supervisor plunger control code and the individual "local" plunger control algorithms for executing logic to optimize a plurality of wells on the wellpad. The processor 43 is coupled to a switch 45 at the pad control location via an ethernet cable 49. Well pad control unit 46, for example an Allen Bradley® controller, converts instructions from each of the individual plunger algorithms into signals for controlling each of the Valve A's at each of the wells (twenty-two shown by way of example and not limitation) of the well pad 48. Well pad control unit 46 is also coupled to the switch 45 via an ethernet cable 49. The well pad control unit 46 also receives data from sensors within each of the well plunger lift systems that can be viewed via the processor 43.

The system 42 may include a display device 47, for example a desktop computer, laptop computer, PDA, wireless telephone, smart phones and/or the like, so that users may have the ability to monitor the performance of the plunger lift system from a remote location. Through remote access, users may have the ability to: open/close the A & B Valves at individual wells; change controller setpoints; and monitor real-time and historical plunger trip data, polled by the controller 46 at a specified data rate.

Overall operation of the present invention is now described in connection with the logic diagrams of FIGS. 4A-B, 5AA-BB, and 5a-5i, which describe an exemplary system having multiple individual well plunger lift control systems supervised by a single supervisor well plunger controller. Note, although the operation of the well controller is described with reference to the operation of valves at plunger lift mechanisms in general at each of the individual wells, it is known and appreciated by those skilled in the art the that the present invention can be modified and adapted to optimize operation of the individual well and grouping of wells in accordance with one or more operating or performance parameters, including but not limited to hydrocarbon production rates, power usage/consumption rates, equipment maintenance requirements, crew scheduling, safety requirements, etc.

Figure 4A:
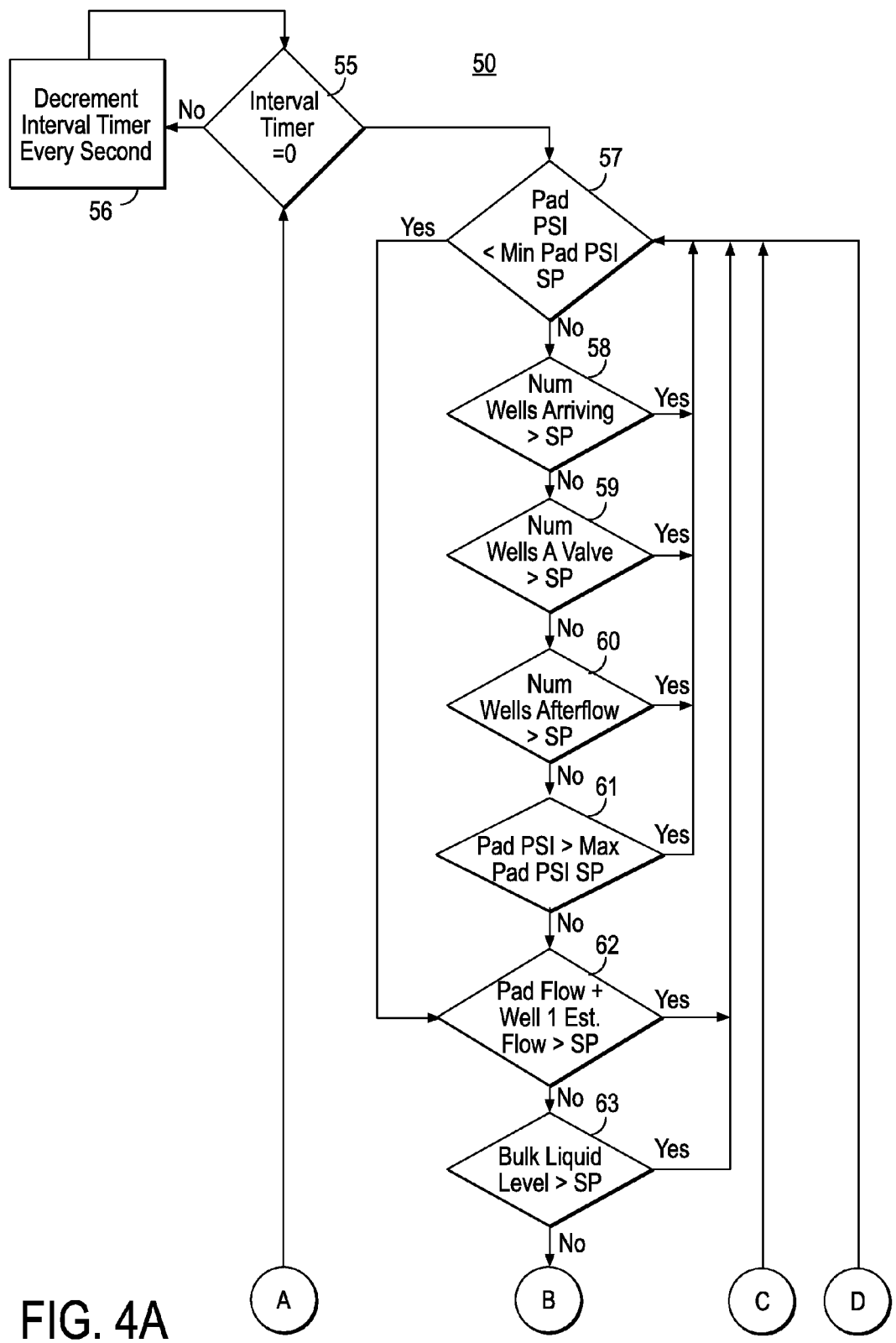

FIGS. 4A and 4B show exemplary logic for a well plunger lift control supervisor in accordance with the present invention. Referring first to FIG. 4B, the supervisor logic 50 is initiated via startup procedure 51, followed by step 52 to fire "Open Triggers" on individual wells. Open triggers represent points at which a particular well should automatically open after it has been shut in. The well should be closed for long enough for the plunger to reach bottom, as well as long enough to build pressure to bring the plunger and fluid to the surface on the next trip. However, it should not be closed for too long, as extra time closed equates to lost production. Additionally, having the well shut in for too long can cause too much pressure to build, risking a fast or critically fast arrival. Wells are then added to the next open spot in a well queue, step 53, starting with Position 1.

Next, if a well has been added to a Position 1 in the queue, step 54, an interval timer is polled, step 55 in FIG. 4A, and decremented every second if the interval timer is not equal to zero, step 56. If the internal timer is equal to zero, the supervisor logic continues with the steps for authorizing the requests based on one or more criteria, for example steps 57-63, 65 and 66, associated with the well grouping so as to coordinate operation of the individual wells. The criteria shown in steps 57-63, 65 and 66, by way of example and not limitation, relate to well pad plunger lift parameters such overall wellpad pressure, plunger arrival states, number of open or closed valves, well pad flow rate, etc. Other criteria may relate to overall well pad equipment power consumption, equipment maintenance scheduling, safety requirements, and other operating parameters associated with the wellpad. Criteria may include limits on equipment electrical power consumption during peak usage hours so as to minimize operating costs of the well pad. Such power related criteria may include well pad maximum loads, average loads, peak currents, voltage levels, etc. Equipment usage criteria may relate to scheduled maintenance, equipment utilization (i.e., max/min utilization rates for well pad equipment). Safety related criteria may include the presence of sensed fault currents, leaks or other potentially unsafe conditions in the vicinity of one or more wells in the well pad.

Referring again to FIGS. 4A & 4B, the supervisor logic first compares the current real-time value of the overall well pad's pressure ("Pad PSI") to a minimum Pad PSI setpoint or threshold ("Min Pad PSI SP"), step 57. The Min Pad PSI SP setpoint, as well as the other setpoints, can be selected by an operator as required depending on the particulars of the well pad. See for example the setpoint values in the Supervisor Setpoints interface shown in FIG. 13.

Referring again to FIG. 4A, if Pad PSI is less than Min Pad PSI SP, then the supervisor proceeds to step 62, which is described in more detail below. If the Pad PSI is greater than or equal to Min Pad PSI SP in step 57, then Num Wells Arriving is compared to a setpoint, step 58. "Num Wells Arriving" is the number of wells on the well pad having a plunger in transit and currently arriving, i.e., in a position between well opening and plunger arrival). If Num Wells Arriving exceeds the setpoint, then the supervisor logic loops back to step 57. Otherwise, if Num Wells Arriving is equal or less than the setpoint, then the number of wells on the pad with an open A valve ("Num Wells A Valve") is compared to its setpoint, step 59. If Num Wells A Valve exceeds its setpoint, then control loops back to step 57, otherwise the number of number of wells on the pad currently in the Afterflow state, i.e., between Plunger Arrival and Well Closing, is compared to a corresponding setpoint, step 60. Steps 61-63, 65, and 66 involve similar logic steps: the current real-time Pad PSI is compared to a maximum Pad PSI setpoint, step 61; the current real-time Pad Gas Flow Rate is compared to a maximum gas flow rate setpoint, step 62; the current real-time level of liquid in the bulk separator ("Bulk Liquid Level") is compared to a maximum liquid level setpoint, step 63; the current real-time level of liquid in the tank ("Tank Level") is compared to a maximum tank level, step 65 of FIG. 4B; and the number of wells on the pad with an open B Valve ("Num B Valve Wells") is compared to maximum number of open B valves, step 66 of FIG. 4B.

In one embodiment of the present invention, Well 1 in the supervisor queue is constrained from leaving the queue if the Pad PSI is greater than the Max Pad Pressure entered on the Supervisor Setpoints screen, and de-constrains the well if the Pad PSI is lower than the Min Pad Pressure. Well 1 is also constrained from leaving the supervisor queue if the quantity of the Pad Gas Flow Rate plus a predicted flow rate (max rate from its last cycle) of the well at the top of the queue (Well 1) is greater than the Max Gas Rate setpoint. Similarly, Well 1 is constrained from leaving the supervisor queue if (1) the Bulk Liquid Level is greater than the Max Liquid Level setpoint and the well is enabled to vent to B Valve, step 64 of FIG. 4B; (2) the Tank Level is greater than the Max Tank Level setpoint and the next well is enabled to vent to B Valve; and (3) the Num B Valve Wells is greater than the Max Wells B Valve setpoint.

Referring again to FIG. 4B, if the B Valve is not enabled per step 64 or if Num B Valves does not exceed its corresponding setpoint step 66, the supervisor logic allows the well in position 1 (Well 1) to open, step 67, and thus the well in position 1 leaves the queue, step 68, and the queue is re-ordered per step 69. An Internal time, which is the amount of time since the last well left the supervisor queue, is then reset according to step 70. Nominally, the Interval Timer counts up to the Well Interval Time setpoint entered on the Supervisor Setpoints screen as per step 56. If a different well is placed in position one of the queue, step 54, then the supervisor loops back to step 55, otherwise an Open Trigger fires on individual wells, step 52, and the wells are added to the next open spots starting with position 1, step 53

The supervisor further computes the following parameters, which may be used in the supervisor control logic: (1) Constraint Check Time, i.e., the length of time the supervisor queue has been running; (2) the Longest Queue Wait Time, i.e., the longest amount of time that one of the wells; and (3) the Interval Time Left, i.e., the amount of time before the next well can leave the supervisor queue. In one embodiment, the Interval Time Left de-increments from the Well Interval Time setpoint entered on the Supervisor Setpoints screen.

Figure 5B:
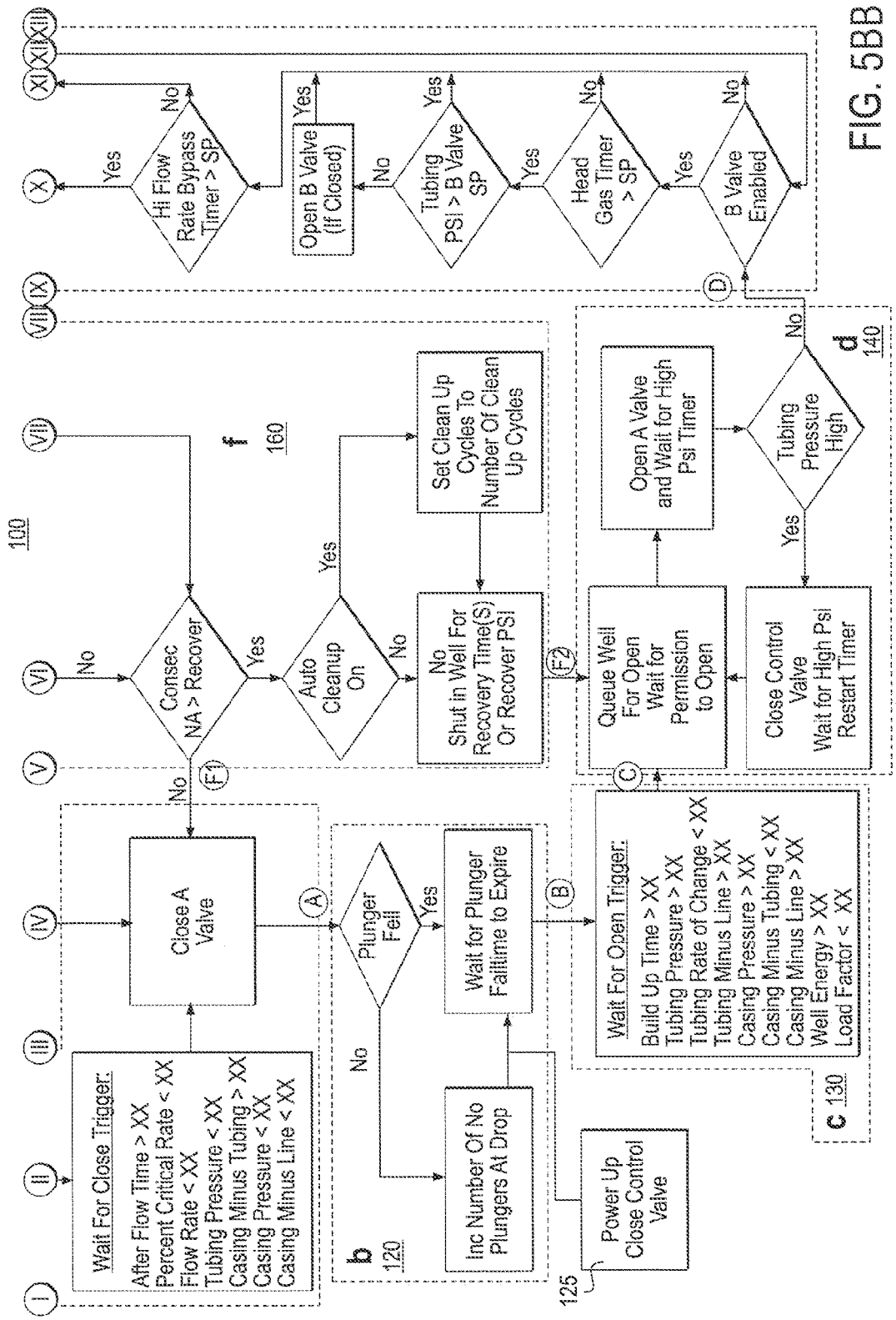
Figure 5A:
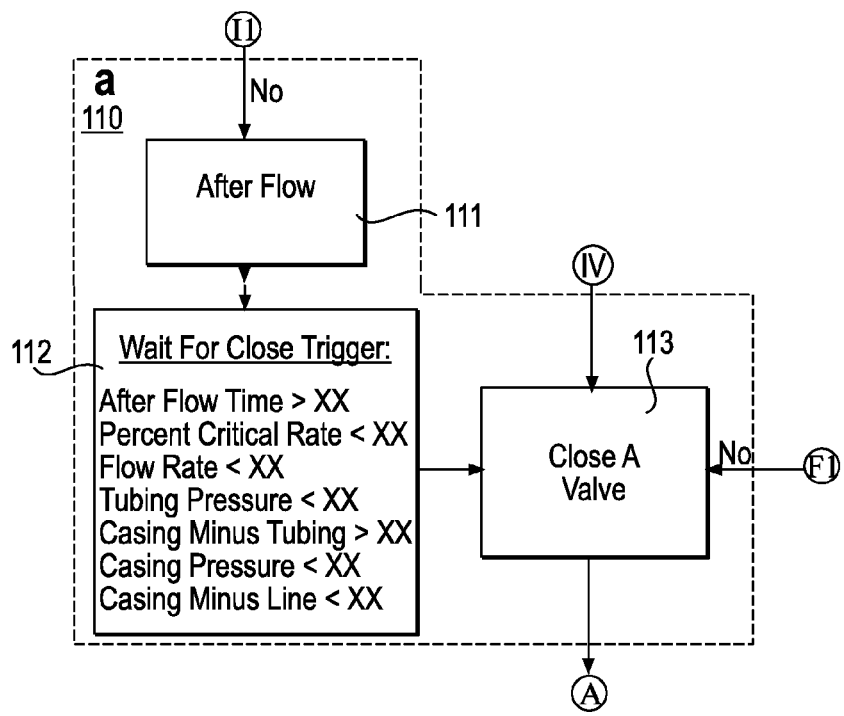
FIGS. 5AA-BB and related
Figure 5B:
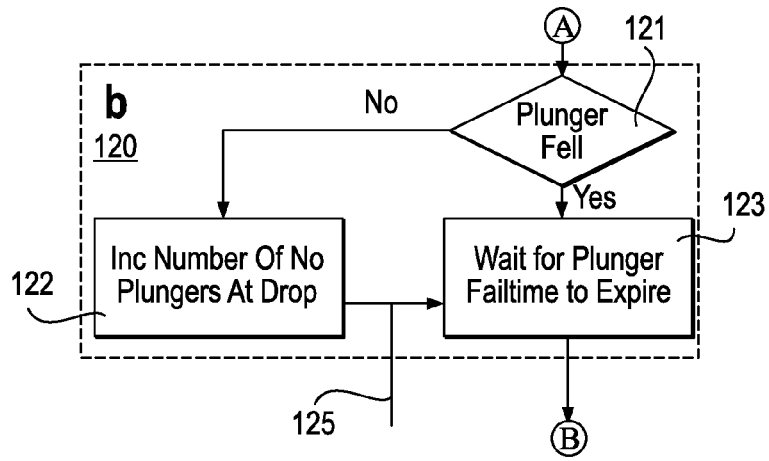

FIGS. 5AA and 5BB show an exemplary method for a well plunger lift single well controller in accordance with the present invention. Each of the logical subunits a-i of FIGS. 5AA and 5BB (shown as reference numerals 110-190) are shown individually in FIGS. 5a through 5i. In accordance with one embodiment of the present invention, the method described below with reference to FIGS. 5a and 5i are used to queue wells for permission to open by the supervisor logic described with reference to FIGS. 4A and 4B.

Referring first to FIG. 5a, a well is in Afterflow state (the plunger has arrived), step 111, and waiting for a trigger to close the well, step 112. Each trigger can be adjusted per well on the Plunger Lift Well Setpoints screen 400 under "Close Triggers" as shown for example in FIG. 9. Exemplary Close Trigger values are shown in FIG. 9, reference numeral 420. In one embodiment, at least one of the Close Trigger conditions must be satisfied before the valve A is closed in accordance with step 113. Nominally, each close trigger also has a timer set point. See for example "Trigger True Timer Present" in FIG. 9. Prior to closing the well, the controller will wait for the Close Trigger Timer to expire to ensure that the trigger has fired consistently. This will prevent the well from fluctuating over and under a setpoint.

With reference to FIG. 5b, after the A Valve is closed, the controller determines whether the plunger was sensed falling, step 121. The controller tallies the number of times that the arrival sensor does not sense the plunger falling as "No Falls," step 122. The No Fall metric can be viewed on a plunger status screen and can be used to quickly identify trends in plunger lift system performance, including identifying plungers consistently leaving the wellhead early, bad arrival sensors or other problems associated with the plunger not falling. The system logic then waits for the Plunger Fall Time to expire, step 123, according to the Plunger Fall Time setpoint, which is shown by way of example in Miscellaneous Setpoints 470 of FIG. 9.

Figure 5C:
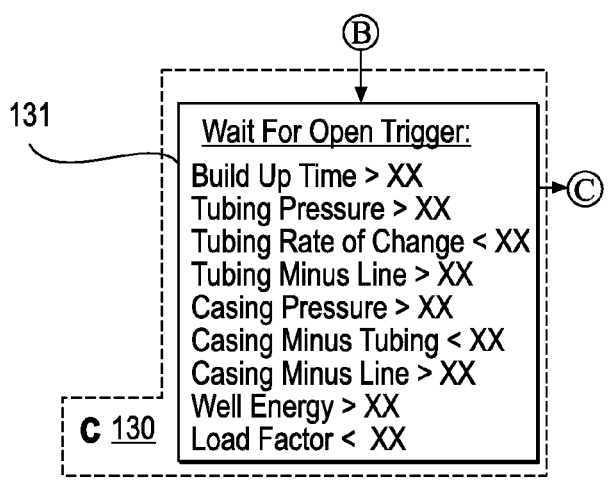

With reference to FIG. 5c, after the Plunger Fall Time has expired, step 123, the well remains shut and pressure builds. This state is called Build Up. The well remains shut in until at least one of the Open Trigger fires, step 131. Each Open Trigger can be adjusted, by well, on the Plunger Lift Setpoints screen under "Open Triggers," reference number 410, as shown by way of example in FIG. 9. In one embodiment, the Open Triggers do not have associated timers because the variables that are being assessed will tend to be more stable as the well is opened in comparison to when it was closed.

Figure 5D:
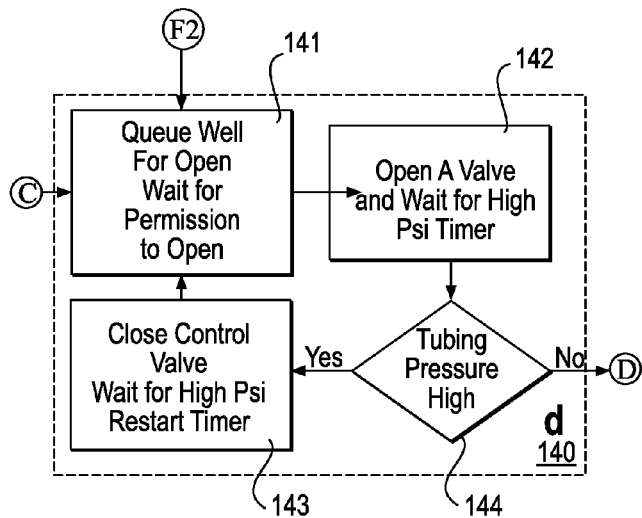

With reference to FIG. 5d, the well enters the supervisor queue for permission to open after an Open Trigger fires, step 141. Note, the supervisor queue prevents several wells from syncing up and opening/closing at the same time. This limits potential problems arising from the compressor having too much or too little gas to run when many wells are running on the same cycle, i.e., the supervisor can activate wells in the event there is insufficient gas present so as to prevent a compressor from "starving" for gas.

Next, the A Valve is opened once a well is allowed to leave the supervisor queue, and if the line/tubing pressure is too high, step 144, the A Valve remains is closed and a Flow Line Hi Restart timer (see "Plunger Arriving Setpoints 430 in FIG. 9) is run to allow the line pressure to decrease, step 143. The controller then waits for the Flow Line Hi Restart Timer to expire and continues to check the line pressure to determine whether it is above the Flow Line Hi PSI Setpoint, meaning line pressure is too high for the plunger to arrive. The well is then placed back in the supervisor queue to attempt to open again, step 141. This process (steps 141-144) repeats until line pressure decreases.

Figure 5E:
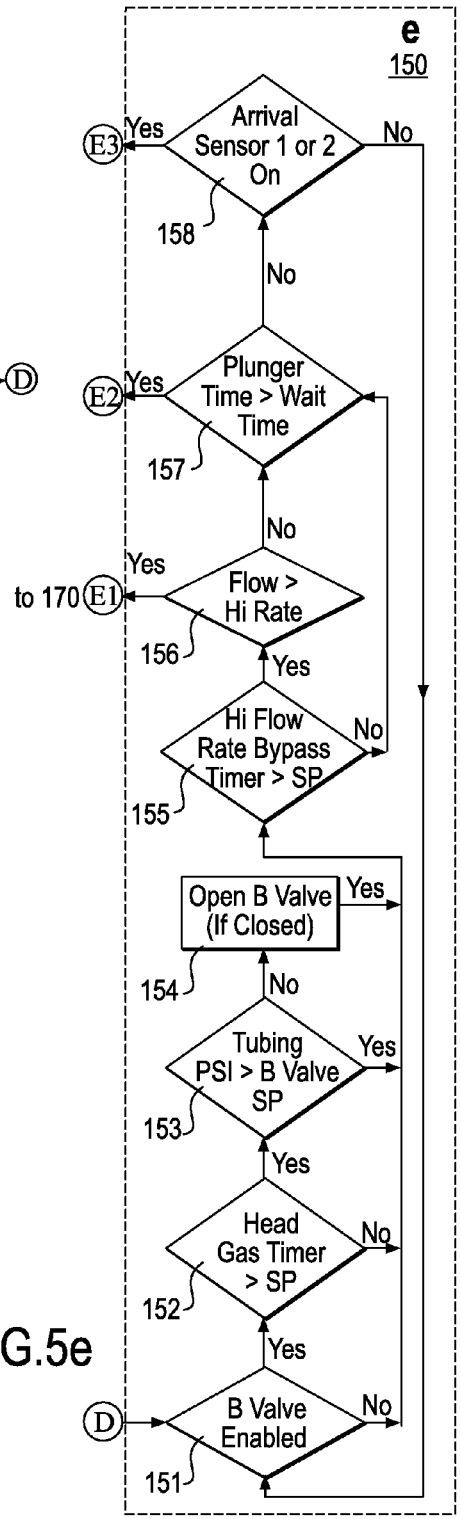

With reference to FIG. 5e, once the line pressure is low enough, the well is opened and the controller begins continuously checking for Plunger Arrival, step 158. The controller also checks whether the B Valve was enabled on the last trip, step 151. If the B Valve was enabled, the B Valve Head Gas Timer (see "Plunger Arriving Setpoints" 430 in FIG. 9) begins to count down, step 152. This is the amount of time that the controller should wait prior to opening the B Valve to allow head gas to go to sales. When the Head Gas Timer expires, the controller checks the Tubing Pressure, step 153. The controller waits to vent to B Valve until after the tubing pressure decreases below the B Valve Max PSI setpoint (see "Plunger Arriving Setpoints" 430 in FIG. 9). The controller continues to check for plunger arrival, step 158. If the well is enabled to vent to B Valve and if the plunger does arrive before the B Valve is opened, the controller will not open the B Valve. If the plunger has not arrived, the Head Gas timer has expired and the Tubing pressure is below the allowable value, the B Valve will open, step 154. The controller also checks the well's flow rate during this period before plunger arrival. A Gas Hi Flow Rate Bypass Timer (see "Plunger Arriving Setpoints" 430 in FIG. 9) begins counting down when the well opens, step 155. This timer allows the initial high flow rate of the well to expire before checking to determine whether the plunger is arriving extremely fast. A flow above a Gas High Flow setpoint (see "Plunger Arriving Setpoints" 430 in FIG. 9) indicates the plunger is arriving too quickly and is likely coming up the wellbore dry, step 156. The High Flow rate must occur for longer than the Gas High Flow Rate Timer (see "Plunger Arriving Setpoints" 430 in FIG. 9) to ensure that the high flow is continuously occurring. The well will be shut in for operator intervention if a high flow rate is sensed under these conditions. Plunger Wait Time (see "Plunger Arriving Setpoints" 430 in FIG. 9) also begins counting down from the time the well opens, step 157. This is the maximum amount of time that it takes a plunger to arrive for the well. A failed trip occurs when the plunger does not arrive in this time period.

Figure 5F:
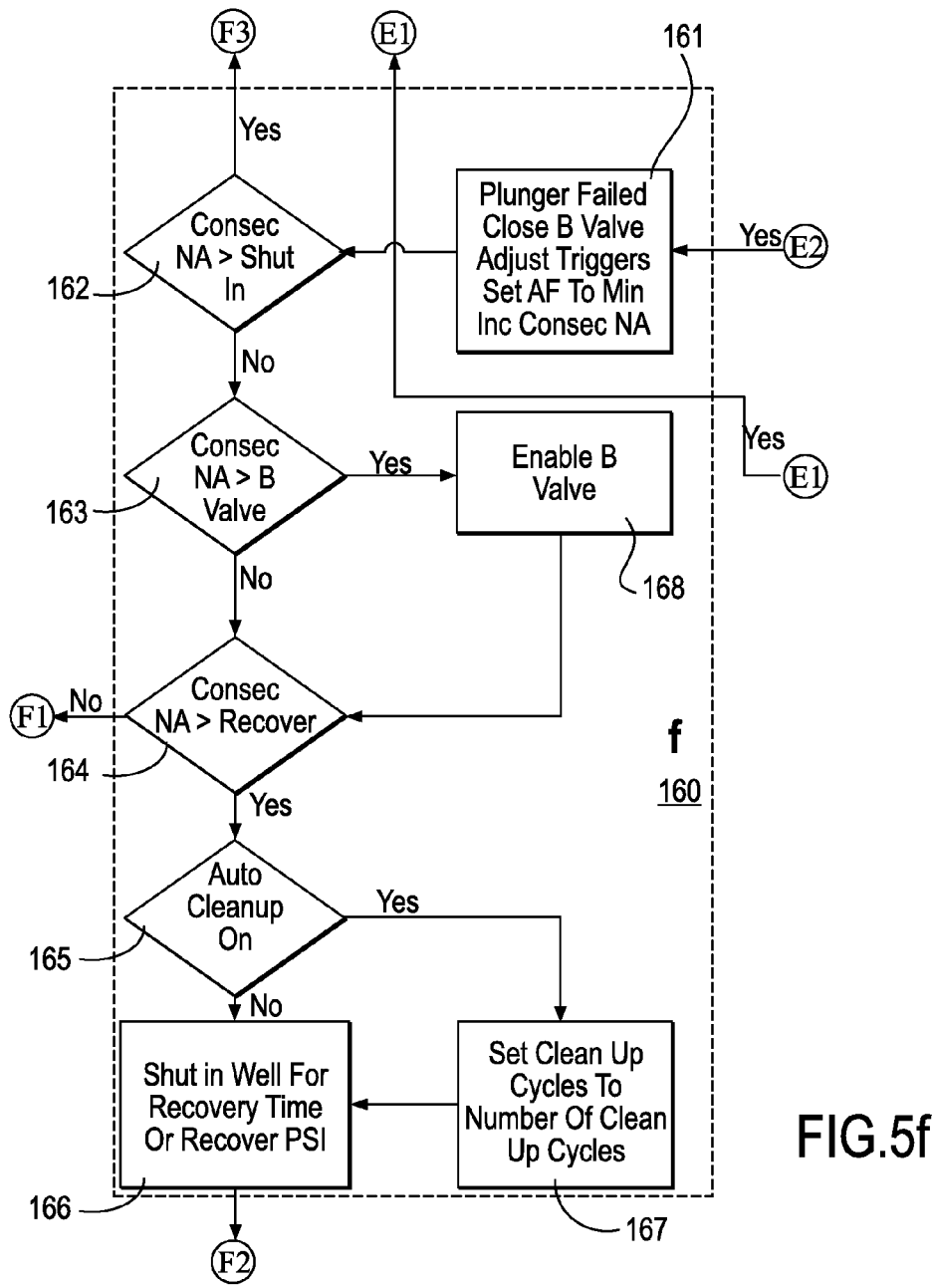

With reference to FIG. 5f, if the arrival sensor was not tripped prior to the end of the Plunger Wait Time, the plunger has failed to arrive, step 161. Non-arrivals are handled differently depending on the number of times that the plunger has failed to arrive. The controller makes efforts to resolve the missed trips and bring the plunger to the surface. If the number of failed trips has exceeded the Shut In No. of Trips (see "Plunger No Arrival Setpoints" 460 in FIG. 9), step 162, the well is shut in for intervention, step 170 (See FIG. 5h). The B Valve is enabled, step 168, if the number of non-arrivals has exceeded the B Valve No. of Trips (see "Plunger No Arrival Setpoints" 460 in FIG. 9), step 163. This enablement permits the B Valve to be opened after the well is opened on the next cycle. The controller determines whether Auto Clean Up is turned On, step 165. If no, then the well is shut in for a Recovery time or until a Recovery Tubing PSI is satisfied, step 166. If yes, prior to step 166, the number of Clean Up Cycles are set based on the Auto Cleanup Cycles Set Point (see "Plunger No Arrival Setpoints" 460 in FIG. 9), step 167. Clean Up Cycles will run the well using the minimum afterflow (see "Automatic Afterflows Setpoints" 460 in FIG. 9) as the afterflow time trigger for the indicated number of cycles.

If the number of non-arrivals has exceeded the Consec No Arrival Recover setpoint (see "Plunger No Arrival Setpoints" 460 in FIG. 9), step 164, the well will be closed for the appropriate Recovery Time (see "Plunger No Arrival Setpoints" 460 in FIG. 9) to try to build pressure and bring the plunger back to the surface, step 113 (see FIG. 5*a*).

Figure 5G:
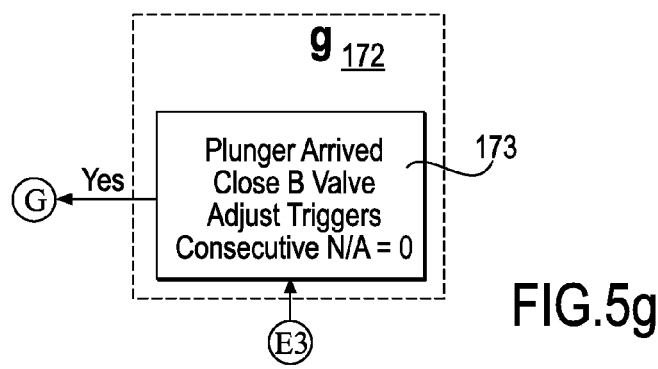

A well with a B Valve enabled can also be shut in for a Recovery Time, provided it's met the criteria for number of non-arrivals. The Recover Tubing PSI (see "Plunger No Arrival Setpoints" 460 in FIG. 9) can open the well during recovery if the tubing pressure has reached this critically high value. If the number of non-arrivals doesn't exceed the number required for Recovery, the A Valve will be closed and the well will return to the normal optimization process. Provided the well has not been shut in for Operator intervention, it will be placed back in the supervisor queue to re-open after the Recovery time has expired. The process to open the well and attempt to bring the plunger to the surface will repeat again. If the plunger arrives, the appropriate Clean Up Cycles will be run. With reference to FIG. 5*g*, If the plunger is sensed arriving during the Plunger Wait Time, the plunger is considered to have arrived, and the B Valve is closed at this point (if it was previously opened) and consecutive non-arrivals are set to 0, step 173.

The controller also has the ability to adjust afterflow time depending on whether the plunger arrived earlier or later than its ideal arrival time. If the plunger arrives earlier or later than the target time, an afterflow adjustment is calculated using the difference between the Plunger Target time (see "Automatic Afterflows Setpoints" 440 in FIG. 9) and the actual arrival time and then multiplying by either a fast or slow Gain factor (Automatic Afterflow setpoints):

(|Plunger Target Time−Actual Arrival Time|)*Gain

Note, if the plunger is early, and if the calculated afterflow adjustment is less than the Afterflow Max Step Up (see "Automatic Afterflows Setpoints" 440 in FIG. 9), the afterflow adjustment is added in full to the previous afterflow time. If the afterflow adjustment is greater than the Max Afterflow Step Up, then the Max Step Up is added to the previous afterflow time. This is true until the afterflow time reaches the Afterflow Max (see "Automatic Afterflows Setpoints" 440 in FIG. 9), at which point no further adjustment is made.

If the plunger is late, and the calculated afterflow adjustment is less the Afterflow Max Step Down (see "Automatic Afterflows Setpoints" 440 in FIG. 9), the afterflow adjustment is subtracted in full from the afterflow time. If the adjustment is greater than the Max Afterflow Step Down, then the Max Step Down is subtracted from the next afterflow time. This is true until the afterflow time reaches the Afterflow Min (see "Automatic Afterflows Setpoints" 440 in FIG. 9), at which point no further adjustment is made.

In the event of a missed trip when Cleanup Cycles have been set, the afterflow time trigger will return to its minimum on the next cycle. Afterflow adjustment begins again once Cleanup Cycles have ended.

Figure 5H:
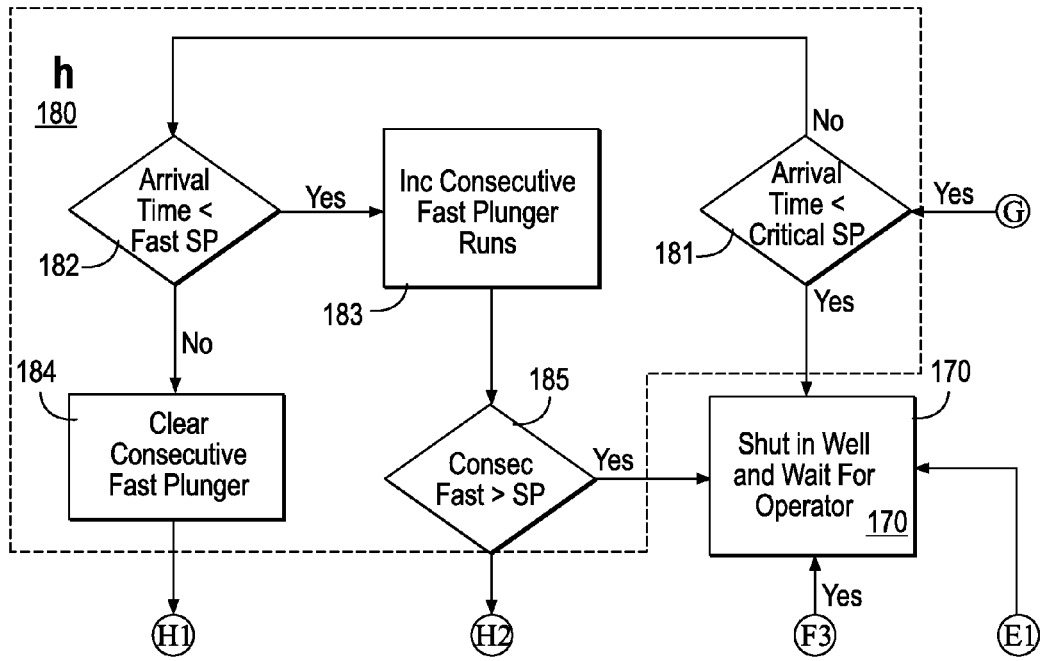
Figure 5I:
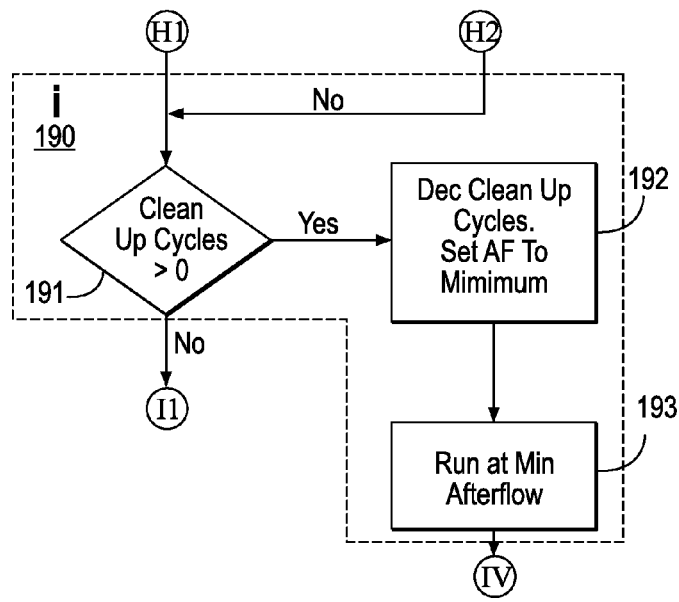

With reference to FIG. 5*h*, after the plunger arrives, the controller also assesses the arrival speed to determine whether the arrival or several consecutive arrivals have been fast enough to potentially cause damage to the wellhead, steps 181-185. The controller checks to ensure that the plunger did not arrive faster than either the Critical Fast or Fast Arrival times, steps 181-182. If the plunger arrived faster than the Plunger Critical Fast Time (see "Plunger Arriving Setpoints" 430 in FIG. 9), the well is shut in to wait for Operator intervention, step 170. The number of consecutive fast plunger runs is examined if the plunger arrived faster than the Plunger Fast Time (see "Plunger Arriving Setpoints" 430 in FIG. 9), steps 183 and 185. The well is shut in to wait for Operator intervention if the number of consecutive fast arrivals exceeds the Plunger Consecutive Fast Shut In point (see "Plunger Arriving Setpoints" 430 in FIG. 9), step 170. The number of consecutive fast plunger runs is cleared to 0 if the plunger did not arrive at a Critical Fast or Fast Time, step 184.

With reference to FIG. 5*i*, the controller determines whether any clean up cycles have been set after a non-arrival on a previous trip. If Clean Up Cycles>0, step 191, the afterflow trigger is set to its minimum and the number of clean up cycles remaining are decreased by 1, step 192. The well is in afterflow again and will remain so until the current calculated Afterflow time counts down to zero or another Close Trigger fires, step 193.

Figure 6:
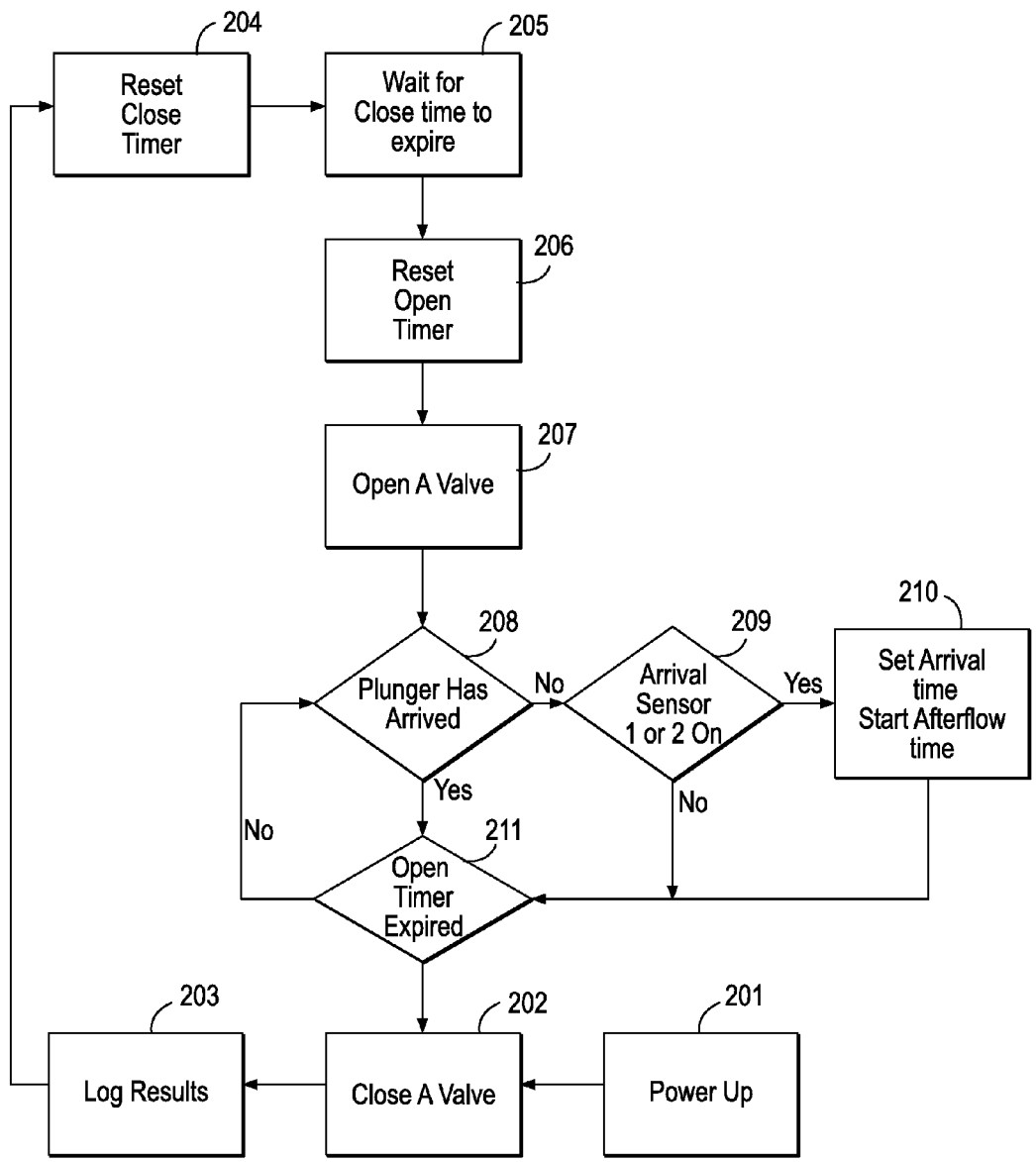
FIG. 6 is a flow chart showing an exemplary method for an intermitter well controller in accordance with the present invention.

FIG. 6 shows exemplary logic for an intermitter well controller in accordance with the present invention. In lieu of the logic described with reference to FIGS. 5*a*-5*i*, the controller in "intermitter mode" opens and closes the A Valve based only on times shown in the "Intermitter Setpoints" 450 in FIG. 9. After power, step 201, the A Valve is closed, results are logged and a Close Timer reset, steps 202-204. Next, the controller waits for the Close Time to expire, an Open Timer is Reset, and the A Valve is opened, steps 205-207. If the plunger has arrived, and if the Open Time has expired, then the A Valve is closed, steps 208-211. If the Open Timer has not counted down in accordance with the Open Time setpoint, then the controller logic loops back to step 208.

If the plunger has not arrived per step 208, then the logic polls the arrival sensors to determine if one or more are on, step 209. If "yes," then arrival and afterflow times are set, step 210, and the logic proceeds to step 211.

Figure 7:
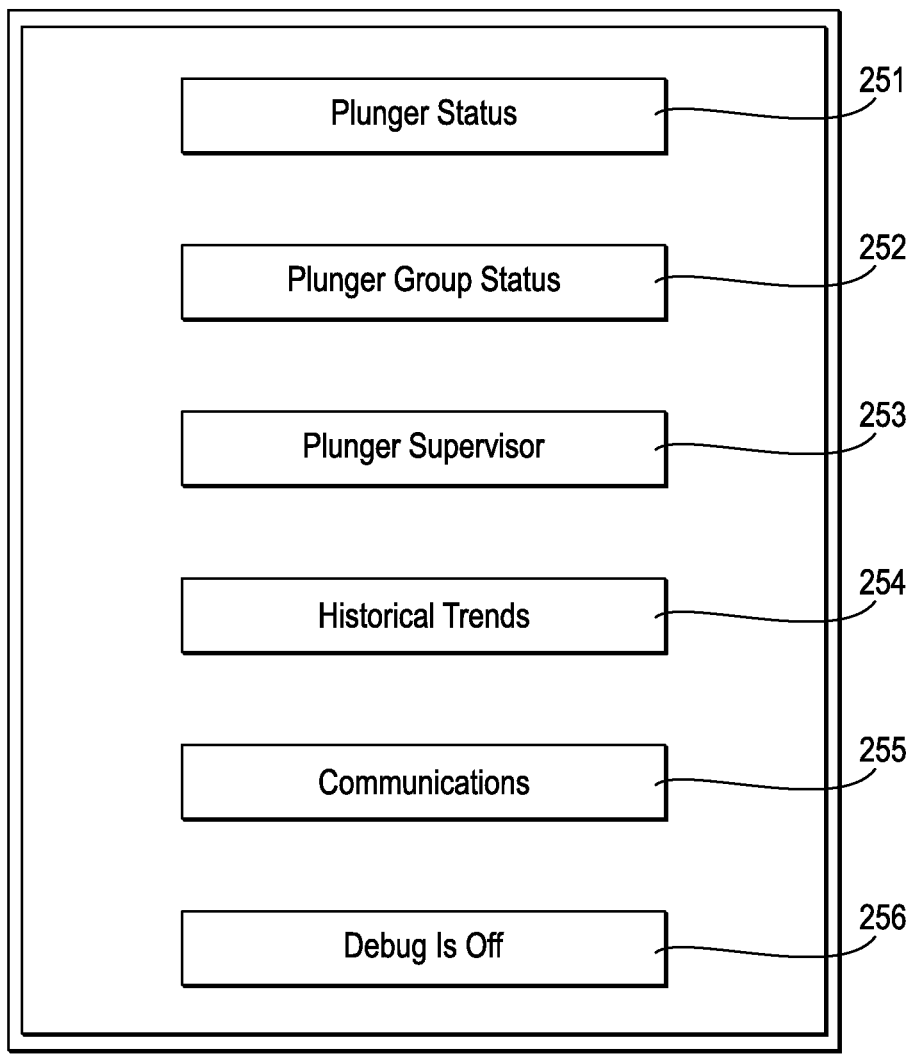
FIG. 7 is an exemplary start-up graphical user interface for a well plunger lift control system in accordance with the present invention.

FIG. 7 shows an exemplary start-up panel or main menu 250 for system of the present invention. The display includes buttons 251-256 that allow a user to navigate and view all the data necessary to monitor the performance of the well plunger lift control system and to make adjustments to the plunger lift settings. Buttons can be used to optimize system performance. Plunger Status 251 provides multiple pieces of information for a single well, and is used to display operating parameters of a single plunger lift well. Plunger Group Status 252 is a summary of the status of all wells with plunger lift controllers, and can be used by an operator to quickly identify which wells may be having problems at the current time. Plunger Supervisor provides multiple pieces of information for a wellpad, including supervisory statistics needed to understand how the controller is optimizing the operation of the wellpad. Historical Trends 254 displays trend data for individual wells and wellpad that can be useful for optimal operation of the wellpad.

Figure 8:
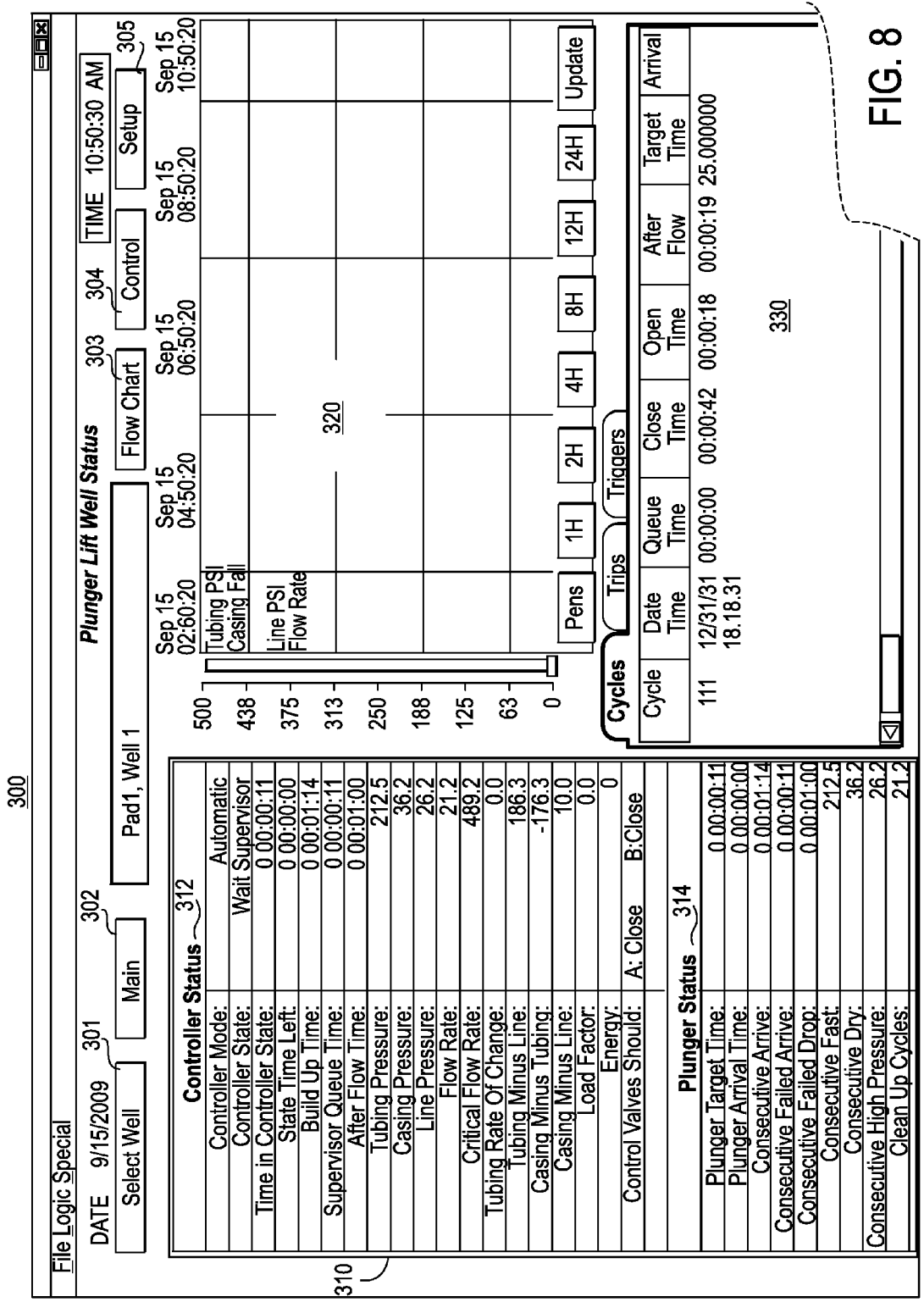
FIG. 8 is an exemplary graphical user interface for displaying individual well plunger lift status information in accordance with the present invention.

FIG. 8 shows an exemplary graphical user interface 300 for displaying individual well plunger lift status information in accordance with the present invention. The interface includes displays for controller and plunger status, reference numerals 312 and 314 respectively.

FIG. 9 shows an exemplary graphical user interface 400 for displaying and setting plunger lift well setpoints in accordance with the present invention. FIG. 9 includes exemplary Open and Close Trigger setpoints, which are described below, respectively, in Tables 1 and 2:

TABLE 1

Open Trigger Set Points

| Set Point | Definition |
|---|---|
| Buildup Time> | The well is opened when the buildup time (time since the A Valve was closed) has exceeded the set point. |
| Energy> | The well is opened when the Well Energy, or area below the pressure vs. time curve increases above the set point |
| Casing PSI> | The well is opened when the casing pressure increases above the setpoint |
| Casing Minus Tubing< | The well is opened when the difference between the casing and tubing pressures decreases below the set point, indicating liquid loading |
| Casing Minus Line> | The well is opened when the difference between the casing and line pressures increases above the set point. |
| Load Factor< | The well is opened when the Load Factor, or amount of line pressure available to lift the present liquid, falls below the set point. Load factor = (CsgP − TbgP)/(CsgP − LineP)) * 100. |
| Tubing PSI> | The well is opened when the Tubing Pressure is greater than the set point entered. |
| Tubing Minus Line> | The well is opened when the difference between the tubing and line pressures increases above the set point entered. |
| Tubing Rate of Change< | The well is opened when the Tubing Rate of Change slows to less than the set point entered, indicating that pressure is no longer continuing to build. |

TABLE 2

Close Trigger Set Points

| Set Point | Definition |
|---|---|
| Trigger True Timer Present > | The length of time that a close trigger must fire in order to confirm that the trigger is sustained and close the well. |
| Flow Rate < | The well is closed when the Flow Rate falls below the set point for longer than the Trigger True Timer Preset. |
| Percent Critical Flow < | The well is closed when its current flow equals this percentage of critical flow (gas rate vs. tubing pressure) for longer than the Trigger True Timer Preset. The Critical Flow Factor (under Miscellaneous set points) is applied to Critical Flow equation to account for deviation in the wellbores. The critical flow equation is: $$q_{g(mscfd)} = \text{Factor} * 1000 \left( 3.067 \times P_{tbg} \times \frac{4.434 \times (67 - 0.0031 \times P_{tbg})^{\frac{1}{4}}}{(0.0031 \times P_{tbg})^{\frac{1}{2}}} \times \frac{\left(\frac{1.995}{2}\right)^2 \times \pi}{144} \times \frac{1}{(100 + 460) * 0.97} \right)$$ |
| Casing PSI < | The well is closed when the Casing Pressure falls below the setpoint for longer than the Trigger True Timer Preset. |
| Casing Minus Tubing > | The well is closed when the difference between the Casing and Tubing Pressure rises above the set point for longer than the Trigger True Timer Preset, indicating that liquid has been unloaded from the well |
| Casing Minus Line < | The well is closed when the difference between the Casing and Line Pressures falls below the set point for longer than the Trigger True Timer Preset. |
| Tubing PSI < | The well is closed when the Tubing Pressure falls below the setpoint for longer than the Trigger True Timer Preset. |

Interface 400 also includes Plunger Arriving Set Points 430, Automatic Afterflow Set Points 440, Intermitter Set Points 450, Plunger No Arrival Set Points 460 and Miscellaneous Set Points 470.

FIG. 10 shows an exemplary graphical user interface 500 for displaying plunger supervisor status information in accordance with the present invention. Interface in region 510 is used to display individual well information, including wells corresponding to different wellpads, such information including but not limited to controller states, state times, target times, and arrival times. The display may also include historical data including number of arrivals and failures for the last day, consecutive arrivals and consecutive failures.

Figure 11:
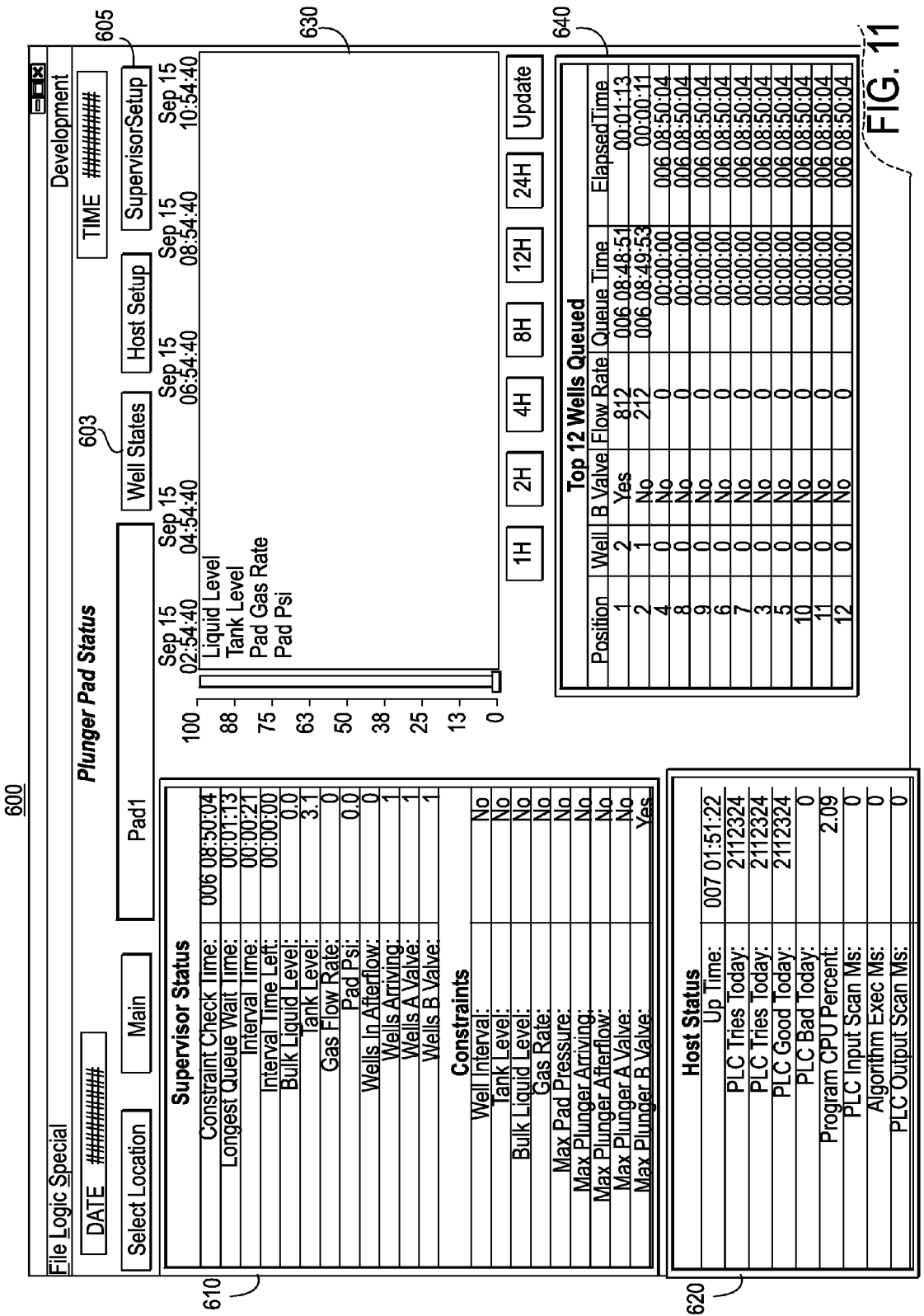
FIG. 11 is an exemplary graphical user interface for displaying plunger pad status information in accordance with the present invention.

FIG. 11 shows an exemplary graphical user interface 600 for displaying plunger pad status information in accordance with the present invention. Interface 600 includes supervisor status and constraints 610, host status 620, and additional operational, performance and/or statistical data including liquid levels, tank levels, pad gas rate and pad psi in region 630, and top (or most frequently) queued wells 640.

FIG. 12 shows an exemplary graphical user interface 700 for displaying and setting plunger lift supervisor setpoints in accordance with the present invention. Supervisor set points may include those shown in Table 3 below:

TABLE 3

Supervisor Setpoints

| Set Point | Definition |
|---|---|
| Well Interval Time | Wells must exit the Supervisor queue with this interval time between them. A well cannot be opened until the prior well has been open for at least this amount of time Note: Interval time should never be shorter than ~30 seconds to give the instrumentation time to catch up and read accurate flows, pressures, etc. before opening the next well |
| Max Tank Level | If the top well in the queue is enabled to vent to B Valve, the level in the blow down tank must be below this value to allow the well to open. This constraint is not considered if the well exiting the queue does not have B Valve enabled |
| Max Liquid Level | The liquid level of the bulk separator must be below this value to allow the next well to open and exit the Supervisor queue |
| Max Gas Rate | The pad's current gas rate + the well at the top of the queue's high rate its last plunger cycle must not exceed this value to allow the next well to open and exit the Supervisor queue |
| Max Pad Pressure | Pad pressure must be below this value to allow the next well to open and exit the Supervisor queue |
| Max Wells Arrive | The maximum number of wells that can be between Well Opening and Plunger Arrival at any given time. If the number of wells in plunger arrival status equals this value, the next well in the Supervisor queue will not be allowed to open. After one of the plungers arrives, the next well in the queue will be allowed to open. |
| Max Wells Afterflow | The maximum number of wells that can be between Plunger Arrival and Well Closing at any given time (in the Afterflow State). If the number of wells in Afterflow equals this value, the next well in the Supervisor queue will not be allowed to open. After one of the wells closes, the next well in the queue will be allowed to open. |
| Max Wells A Valve | Maximum number of wells that can be at any point in the process between Opening and Closing (Arrival + Afterflow states). If the number of wells with an open A Valve equals this value, the next well in the Supervisor queue will not be allowed to open. After one of the wells closes, the next well in the queue will be allowed to open. |
| Max Wells B Valve | The maximum number of wells that can be vented to B Valve at any given time. If one well is already venting to B Valve and another well with B Valve enabled is at the top of the queue, the second well will not be allowed to open. The queue will pause and wait to open the next well until the B Valve is closed on the first well. |

FIG. 13 shows an exemplary graphical user interface 800 for displaying well state information in accordance with the present invention. Close states are shown by circles, open states are shown by pluses, and wait states are shown by triangles.

Advantageously, the above-described systems and methods can be used by Field Specialists, Electrical & Instrumentation Specialists (EIS), and Artificial Lift and Corrosion Representative (ALCR) to more efficiently and safely operate individual wells and well groupings having plunger lift control mechanisms. Field Specialists are typically responsible for: Installing plunger equipment (as requested by ALCR); Monitoring plunger well production (typically done remotely) and working with ALCR to optimize controller settings; and closing and/or operating A Valves & B Valves, manually as needed. EIS's are typically responsible for: Assisting with the ordering of plunger equipment, as necessary; Installing plunger controller hardware at the well site; Supporting Field Specialists as they monitor and optimize the wells through the plunger controller; and Troubleshooting problems (controller, communications, arrival sensor, etc.) ALCRs are typically responsible for: Ordering plunger equipment; Installing plunger equipment; Programming plunger controller settings and monitoring the initial plunger cycles; and Providing technical support to Field Specialists to optimize plunger performance.

Notwithstanding that the present invention has been described above in terms of alternative embodiments, it is anticipated that still other alterations, modifications and applications will become apparent to those skilled in the art after having read this disclosure. It is therefore intended that such disclosure be considered illustrative and not limiting, and that the appended claims be interpreted to include all such applications, alterations, modifications and embodiments as fall within the true spirit and scope of the invention.

What is claimed is:

1. A well control system for a subterranean hydrocarbon reservoir, the system comprising:
   a plurality of well control systems, each of the well control systems being associated with an individual well of a grouping of wells from a well pad in fluid communication with the subterranean reservoir;
   a plurality of well controllers associated with each of the individual well control systems that control operation of the individual well control systems based on one or more criteria associated with the individual well; and
   a supervisor controller in communication with each of the well controllers for coordinating operation of each of the well control systems by allowing or postponing operation of individual wells within the grouping of wells from the well pad until one or more criteria associated with the well pad is satisfied.

2. The system according to claim 1, wherein:
   each of the well control systems comprise a well plunger lift mechanism;
   each of the well controllers comprise a well plunger lift controller for controlling operation of a corresponding well plunger lift mechanism; and
   the supervisor controller comprises a supervisor plunger lift controller in communication with each of the well plunger lift controllers.

3. The system according to claim 1, wherein the supervisor controller comprises a computer processor for executing a computer program, the computer program comprising:
- a first computer program code for generating a plurality of requests to control the individual wells of the grouping of wells from the well pad;
- a second computer program code for queuing the requests such that that the requests are ordered according to each individual well satisfying one or more criteria associated with the individual well; and
- a third computer code for authorizing the requests based on the one or more criteria associated with the well pad so as to coordinate operation of the individual wells within the grouping of wells from the well p.

4. The system according to claim 1, wherein the one or more criteria associated with the well pad relate to plunger lift parameters of the well pad.

5. The system according to claim 1, wherein the one or more criteria associated with the well pad relate to power consumption parameters of the well pad.

6. The system according to claim 1, wherein the one or more criteria associated with the well pad relate to equipment usage parameters of the well pad.

7. The system according to claim 1, wherein the one or more criteria associated with the well pad relate to safety requirements of the well pad.

8. The system according to claim 1, wherein the one or more criteria associated with the well pad include at least one of well pad pressure, well pad flow rate, plunger arrival states of the individual wells within the grouping of wells, a number of open valves of the individual wells within the grouping of wells, or a number of closed valves of the individual wells within the grouping of wells.

9. A computer-implemented method of operating a subterranean hydrocarbon reservoir, the method comprising:
- generating a plurality of requests to control individual wells of a well grouping from a well pad;
- queuing the requests such that the requests are ordered according to when each individual well satisfies one or more individual well criteria; and
- authorizing the requests based on one or more criteria associated with the well pad so as to coordinate operation of the individual wells within the well grouping.

10. The method according to claim 9, wherein the one or more criteria associated with the well pad relate to plunger lift parameters of the well pad.

11. The method according to claim 9, wherein the one or more criteria associated with the well pad relate to power consumption parameters of the well pad.

12. The method according to claim 9, wherein the one or more criteria associated with the well pad relate to equipment usage parameters of the well pad.

13. The method according to claim 9, wherein the one or more criteria associated with the well pad relate to safety requirements of the well pad.

14. The method according to claim 9, wherein the one or more criteria associated with the well pad include at least one of well pad pressure, well pad flow rate, plunger arrival states of the individual wells within the grouping of wells, a number of open valves of the individual wells within the grouping of wells, or a number of closed valves of the individual wells within the grouping of wells.

15. An article of manufacture, comprising computer usable media having a computer readable program code embodied therein, the computer readable program code adapted to be executed to implement a method of conducting activities related to the operation of a hydrocarbon reservoir, the method comprising:
- generating a plurality of requests to control individual wells of a well grouping from a well pad;
- queuing the requests such that the requests are ordered according to when each individual well satisfies one or more individual well criteria; and
- authorizing the requests based on one or more criteria associated with the well pad so as to coordinate operation of the individual wells within the well grouping.

16. The article of manufacture according to claim 15, wherein the one or more criteria associated with the well pad relate to plunger lift parameters of the well pad.

17. The article of manufacture according to claim 15, wherein the one or more criteria associated with the well pad relate to power consumption parameters of the well pad.

18. The article of manufacture according to claim 15, wherein the one or more criteria associated with the well pad relate to equipment usage parameters of the well pad.

19. The article of manufacture according to claim 15, wherein the one or more criteria associated with the well pad relate to safety requirements of the well pad.

20. The article of manufacture according to claim 15, wherein the one or more criteria associated with the well pad include at least one of well pad pressure, well pad flow rate, plunger arrival states of the individual wells within the grouping of wells, a number of open valves of the individual wells within the grouping of wells, or a number of closed valves of the individual wells within the grouping of wells.

* * * * *